(12) United States Patent
Yasuda et al.

(10) Patent No.: US 12,617,052 B2
(45) Date of Patent: May 5, 2026

(54) CONVEYANCE SYSTEM

(71) Applicant: DMG MORI CO., LTD., Nara (JP)

(72) Inventors: Hiroshi Yasuda, Nara (JP); Satoru Kashiwagi, Nara (JP); Keisuke Suzuki, Nara (JP)

(73) Assignee: DMG MORI CO., LTD., Nara (JP)

( * ) Notice: Subject to any disclaimer, the term of this patent is extended or adjusted under 35 U.S.C. 154(b) by 250 days.

(21) Appl. No.: 18/552,126

(22) PCT Filed: Mar. 24, 2021

(86) PCT No.: PCT/JP2021/012298
§ 371 (c)(1),
(2) Date: Sep. 22, 2023

(87) PCT Pub. No.: WO2022/201369
PCT Pub. Date: Sep. 29, 2022

(65) Prior Publication Data
US 2024/0173810 A1 May 30, 2024

(51) Int. Cl.
B23Q 7/04 (2006.01)

(52) U.S. Cl.
CPC .................................... B23Q 7/046 (2013.01)

(58) Field of Classification Search
CPC ...................................................... B23Q 7/046
See application file for complete search history.

(56) References Cited

U.S. PATENT DOCUMENTS 4,180,361 A * 12/1979 Longinotti ........... B65G 57/302
414/789.6
5,358,375 A * 10/1994 Kawada ................ B23Q 7/005
414/277

(Continued)

FOREIGN PATENT DOCUMENTS

EP        3508932 A1     7/2019
JP        S6229203 U     2/1987
(Continued)

OTHER PUBLICATIONS

Extended European Search Report for related Application No. 21932979.4; report dated Jan. 2, 2025.
(Continued)

*Primary Examiner* — Saul Rodriguez
*Assistant Examiner* — Brendan P Tighe
(74) *Attorney, Agent, or Firm* — von Briesen & Roper, s.c.

(57) ABSTRACT

The present invention includes a conveyance device (41) having a moving platform (43), a transfer device (45) and a robot (70) arranged on the moving platform (43), and a controller (80). The transfer device (45) has an engagement member (50) engageable with an object (W) to be conveyed and an advancing and retracting mechanism advancing and retracting the engagement member (50). The controller (80) executes a first moving operation of moving the moving platform (43) to a working position for a holding device (20), an engaging operation of engaging the engagement member (50) with the object (W) by causing the advancing and retracting mechanism to advance the engagement member (50), and an extracting operation of extracting the object (W) from the holding device (20) by causing the advancing and retracting mechanism to retract the engagement member (50), and then executes a second moving operation of moving the moving platform (43) to a working position for an industrial machinery (10), a loading operation of loading the object (W) into the industrial machinery (10) by causing the advancing and retracting mechanism to advance the engagement member (50), and a retracting operation of causing the advancing and retracting mechanism to retract the engagement member (50).

8 Claims, 19 Drawing Sheets

(56) References Cited

U.S. PATENT DOCUMENTS

| | | | | |
|---|---|---|---|---|
| 5,536,137 | A | * | 7/1996 | Jager ......................... B23Q 1/66 |
| | | | | 414/792.8 |
| 6,142,723 | A | * | 11/2000 | Kang ................ H01L 21/67778 |
| | | | | 414/331.14 |
| 2015/0298272 | A1 | * | 10/2015 | Murata .............. B23Q 11/0891 |
| | | | | 414/222.07 |
| 2017/0015373 | A1 | | 1/2017 | Thorwarth |
| 2020/0023481 | A1 | * | 1/2020 | Imboden .................. B65H 5/10 |
| 2020/0238466 | A1 | * | 7/2020 | Morimura ............ B23Q 39/026 |
| 2022/0362896 | A1 | * | 11/2022 | Kienberger ............ B23Q 7/046 |
| 2023/0065489 | A1 | * | 3/2023 | Huber .................. B65G 63/004 |

FOREIGN PATENT DOCUMENTS

| | | | |
|---|---|---|---|
| JP | 2007210757 | A | 8/2007 |
| JP | 2009012948 | A1 | 1/2009 |
| JP | 2009184826 | A | 8/2009 |
| JP | 2016540374 | A | 12/2016 |
| WO | 2019002898 | A1 | 1/2019 |

OTHER PUBLICATIONS

International Search Report for related Application No. PCT/JP2021/012298; report dated May 25, 2021.

* cited by examiner

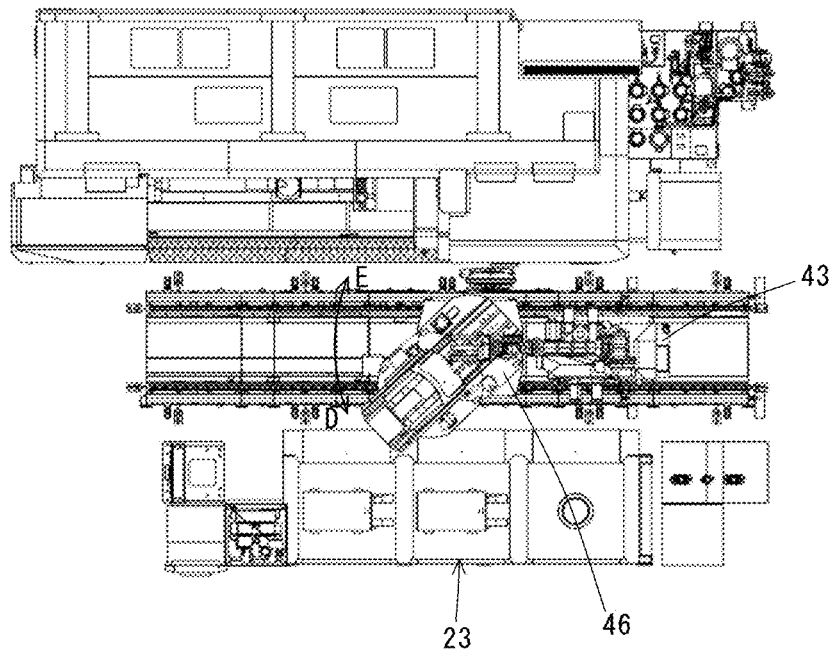
*F I G. 6*
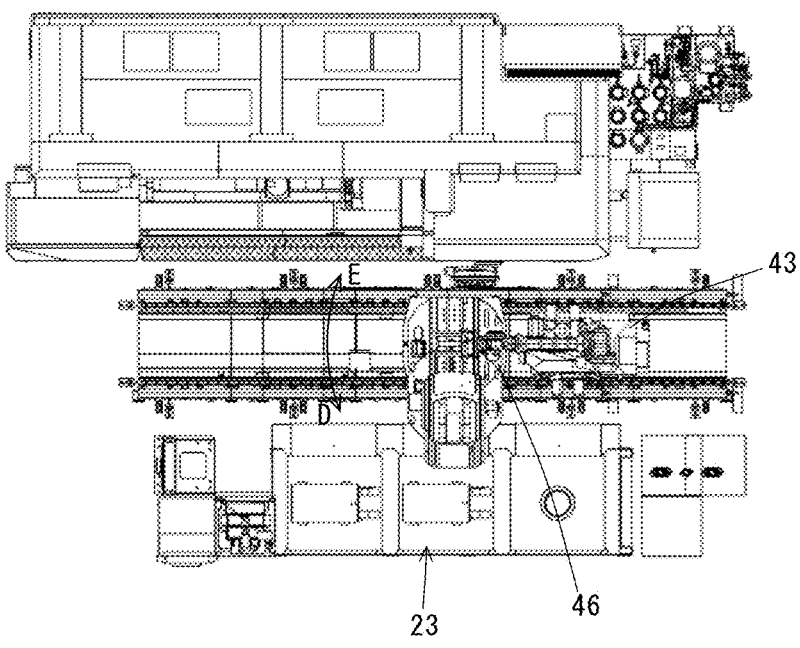
*F I G. 7*

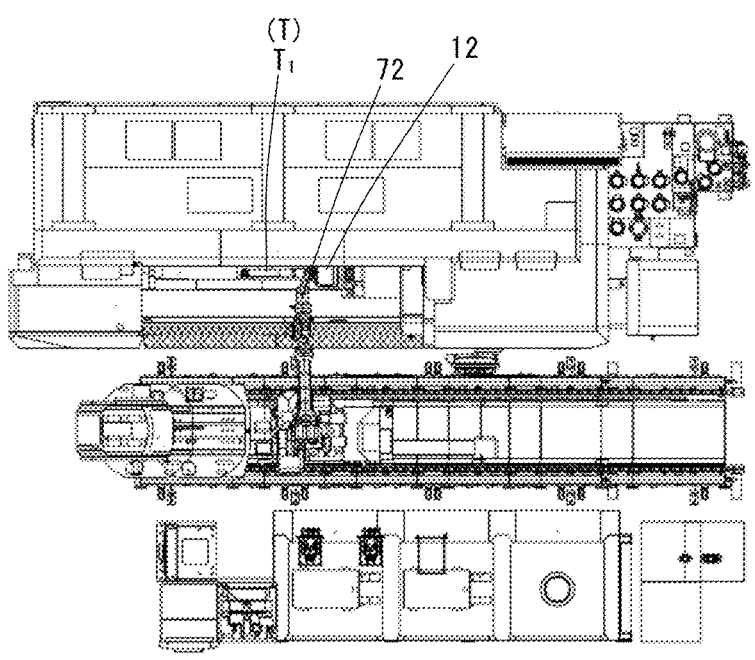
F I G. 3 2
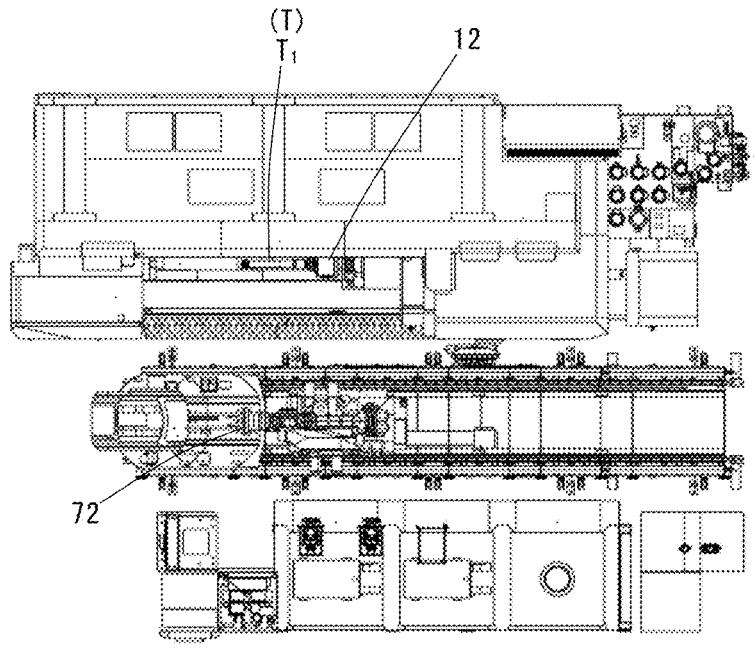
F I G. 3 3

CONVEYANCE SYSTEM

TECHNICAL FIELD

The present invention relates to a conveyance system that extracts an object to be conveyed from a holding device holding the object and conveys the object to a predetermined industrial machinery.

BACKGROUND ART

Japanese Unexamined Patent Application Publication No. 2009-184826 discloses a conventionally known forklift as a conveyance device that is able to extract an object to be conveyed from a holding device and convey the object to a predetermined industrial machinery.

This forklift has a fork, a first support shaft, a first elevating device, an arm, a second support shaft, and a second elevating device. The fork is formed such that a load can be placed on the fork. The first support shaft extends in the vertical direction and supports the fork slidably in the vertical direction. The first elevating device raises and lowers the fork along the first support shaft. The arm is configured to be able to grasp a load. The second support shaft also extends in the vertical direction and supports the arm slidably in the vertical direction. The second elevating device raises and lowers the arm along the second support shaft. The arm is supported on the second support shaft to be able to swing in a direction intersecting the second support shaft and is configured to be able to be bent or curved and configured to be able to be extended.

Since this forklift has the arm configured to be able to grasp a load, when the load to be transported has an irregular shape, the forklift can place the load onto the fork using the arm without requiring packing or the like of the load. Further, even when the load to be transported is heavy and has an irregular shape, the forklift can place the load onto the fork or a pallet on the fork using the arm without using a crane or the like. Thus, this forklift can easily perform loading/unloading and transport of a load having an irregular shape.

Further, since the arm is swingable with respect to the second support shaft, the range of motion of the distal end of the arm is widened. Therefore, for example, when placing onto the fork a load located diagonally in front of the forklift, the forklift can grasp the load with the arm by only swinging the arm without finely adjusting the orientation and the like of the forklift. Thus, this forklift can smoothly and quickly perform loading/unloading and transport of a load.

Further, since the arm is configured to be able to be bent or curved, the arm can more stably grasp or hold a load and fine adjustment of the position of the distal end of the arm can be easily carried out. Therefore, this forklift can more stably grasp or hold a load with the arm and therefore can smoothly and quickly perform loading/unloading and transport of the load. Furthermore, since the arm is configured to be able to be extended; the arm can move more variously. Therefore, the convenience of the arm is more improved.

CITATION LIST

Patent Literature

Patent Literature 1: Japanese Unexamined Patent Application Publication No. 2009-184826

SUMMARY OF INVENTION

Technical Problem

In the field of industrial machineries, especially in the field of machine tools, generalization and automation have been promoted in recent years. In terms of generalization, it is now possible to use a single machine tool to machine objects ranging from light to heavy in weight and ranging from small to large in size. Further, tools used in machining in a single machine tool range from standard-sized tools that are able to be stored in a tool magazine to heavy or large-sized tools.

To automate such a generalized machine tool, a conveyance device (conveyance system) has been desired which is able to load and unload a wide variety of workpieces into and from the machine tool or able to attach and detach heavy or large-sized tools, which are unable to be stored in the tool magazine, to and from a tool holding unit of the machine tool.

However, there has been no conveyance device suitable for automaton of a machine tool generalized as described above. Although, as mentioned above, the forklift disclosed in Japanese Unexamined Patent Application Publication No. 2009-184826 has been proposed, this forklift is configured to be operated by a human; therefore, this forklift cannot realize the automation.

The present invention has been achieved in view of the above-described circumstances and an object of the invention is to provide an automated conveyance system able to convey a wide variety of objects to an industrial machinery.

Solution to Problem

To solve the above-described problem, the present invention provides a conveyance system that extracts an object to be conveyed from a holding device holding the object and conveys the object to a predetermined industrial machinery and that includes:

a conveyance device having a moving platform and configured to move the moving platform to a working position set for the holding device and to a working position set for the industrial machinery;

a transfer device and a robot arranged on the moving platform; and a controller configured to control operations of the moving platform, transfer device, and robot, wherein:

the transfer device has: an engagement member arranged to be engageable with the object; and an advancing and retracting mechanism configured to advance and retract the engagement member in a predetermined direction in a horizontal plane; and the controller is at least configured to sequentially execute a first moving operation of moving the moving platform of the conveyance device to the working position set for the holding device, an engaging operation of engaging the engagement member with the object as a target by causing the advancing and retracting mechanism to advance the engagement member, and an extracting operation of extracting the object from the holding device by causing the advancing and retracting mechanism to retract the engagement member, and thereafter sequentially execute a second moving operation of moving the moving platform to the working position set for the industrial machinery, a loading operation of loading the conveyed object into the industrial machinery by causing the advancing and retracting mechanism to advance the engagement member, and a retracting operation of causing the advancing and retracting mechanism to retract the engagement member.

In this conveyance system, under control by the controller, an object to be conveyed held by the holding device is extracted from the holding device and conveyed to the predetermined industrial machinery in the manner described below.

That is to say, the controller first drives the moving platform to move the moving platform to the working position set for the holding device (first moving operation). Subsequently, the controller drives the advancing and retracting mechanism to advance the engagement member so as to engage the engagement member with the object as a target, and then retract the engagement member so as to extract the object from the holding device. Subsequently, the controller drives the moving platform to move the moving platform to the working position set for the industrial machinery (second moving operation). Subsequently, the controller drives the advancing and retracting mechanism to advance the engagement member so as to load the conveyed object into the industrial machinery (loading operation), and then retract the engagement member (retracting operation).

This conveyance system is able to, through the above-described operations, automatically extract an object to be conveyed held by the holding device from the holding device and convey the object to the industrial machinery. Further, since this conveyance system is configured to convey the object using the transfer device arranged on the moving platform, appropriately setting the load capacity and the like of the moving platform and transfer device enables even a large-sized and heavy object to be conveyed appropriately.

On the other hand, when a relatively small-sized and light object held by the holding device is to be conveyed to the industrial machinery, the conveyance can be carried out using the robot. For example, the controller drives the moving platform to move the moving platform to the working position set for the holding device, subsequently drives the robot to extract the object as a target from the holding device, subsequently drives the moving platform to move the moving platform to the working position set for the industrial machinery, and subsequently drives the robot to load the conveyed object into the industrial machinery.

The conveyance system having the above-described configuration is suitably applied to a case where the holding device and the industrial machinery are arranged such that the direction of access to the holding device and the direction of access to the industrial machinery coincide with each other.

Examples of the industrial machinery include, besides a machine tool as mentioned above, a mining machinery, a chemical machinery, an environmental apparatus, a power transmission apparatus, a tank, an industrial washing machine, a boiler prime mover, a plastics machinery, pneumatic and hydraulic machineries, a transport machinery, and a steel manufacturing machinery which fall within the general definitions. The above-described conveyance system can be applied to these machineries according to the needs.

The above-described conveyance system may have a configuration in which:

the advancing and retracting mechanism of the transfer device is configured to be able to perform an operation of advancing the engagement member in the direction and an operation of retracting the engagement member to an original position, and is further configured to be able to perform an operation of advancing the engagement member in an opposite direction opposite to the direction and an operation of retracting the engagement member to the original position; and the controller is configured to, in the loading operation, load the conveyed object into the industrial machinery by causing the advancing and retracting mechanism to advance the engagement member in the opposite direction.

The conveyance system having this configuration is suitably applied to a case where the holding device and the industrial machinery are arranged such that the direction of access to the holding device and the direction of access to the industrial machinery are opposite to each other and the holding device and the industrial machinery face each other.

Further, the above-described conveyance system may have a configuration in which:

the transfer device further has a turning mechanism configured to turn the engagement member about a vertical axis; and the controller is configured to execute, when executing the second moving operation after execution of the extracting operation, a turning operation of causing the turning mechanism to turn the engagement member such that the advancing and retracting direction of the engagement member is directed toward the industrial machinery, and execute the operations subsequent to the second moving operation.

With the conveyance system having this configuration, where the holding device and the industrial machinery are arranged such that the direction of access to the holding device and the direction of access to the industrial machinery intersect at an angle, it is possible to direct the advancing and retracting direction of the engagement member toward the industrial machinery by causing the turning mechanism to turn the engagement member, thereby allowing the loading operation to be performed on the industrial machinery.

Further, this conveyance system may have a configuration in which the controller is configured to execute the turning operation and the second moving operation in parallel. This configuration enables reduction of the operating time of the conveyance system.

Further, the above-described conveyance system may have a configuration in which:

the transfer device further has a raising and lowering mechanism configured to raise and lower the engagement member; and the controller is configured to, in the engaging operation, engage the engagement member with the object by causing the advancing and retracting mechanism to advance the engagement member and then causing the raising and lowering mechanism to raise the engagement member, and is further configured to, in the loading operation, load the conveyed object into the industrial machinery by causing the advancing and retracting mechanism to advance the engagement member, and thereafter cause the raising and lowering mechanism to lower the engagement member.

Further, the above-described conveyance system may have a configuration in which the controller is configured to operate the conveyance device and transfer device and the robot such that operation of the conveyance device and transfer device and operation of the robot are executed at least partially in parallel.

The above-described conveyance system may have a configuration in which the conveyance device is configured to be able to move the moving platform to a retracted position spaced away from the working position set for the industrial machinery.

The above-described conveyance system may have a configuration in which the conveyance device is configured to be able to move the moving platform to a retracted position spaced away from the working position set for the holding device.

Advantageous Effects of Invention

As described above, the conveyance system according to the present invention is able to automatically extract an object to be conveyed held by the holding device from the holding device and convey the object to the industrial machinery. Further, since this conveyance system is configured to convey the object using the transfer device arranged on the moving platform, appropriately setting the load capacity and the like of the moving platform and transfer device enables even a large-sized and heavy object to be conveyed appropriately. Further, when a relatively small-sized and light object held by the holding device is to be conveyed to the industrial machinery, the conveyance can be carried out using the robot. Thus, the conveyance system according to the present invention is able to automatically convey a wide variety of objects to the industrial machinery.

BRIEF DESCRIPTION OF DRAWINGS

FIG. 6 is an illustrative diagram for explaining operation of the conveyance system in the embodiment;

FIG. 7 is an illustrative diagram for explaining the operation of the conveyance system in the embodiment;

FIG. 32 is an illustrative diagram for explaining the operation of the conveyance system in the embodiment; and FIG. 33 is an illustrative diagram for explaining the operation of the conveyance system in the embodiment.

DESCRIPTION OF EMBODIMENTS

Figure 1:
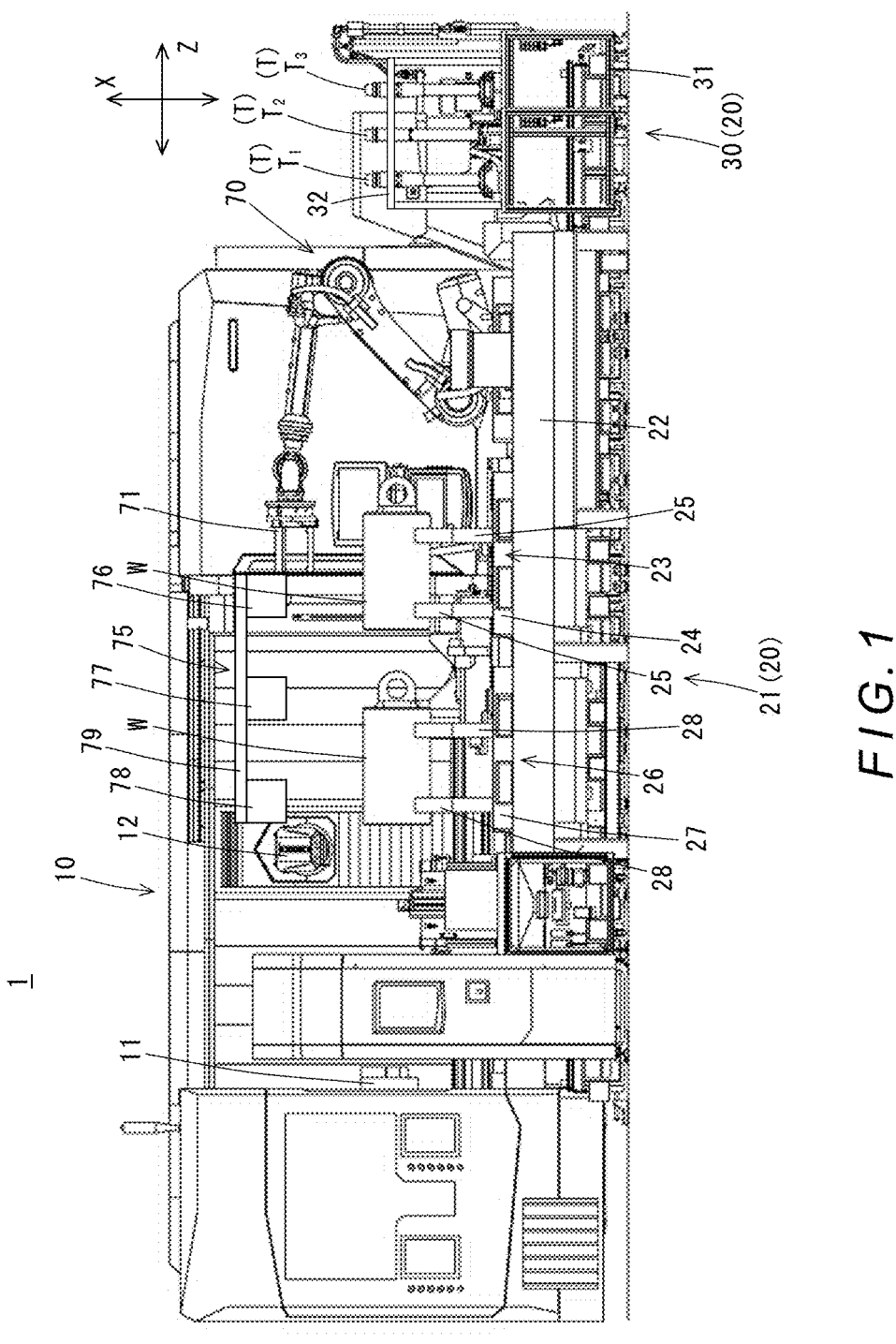
FIG. 1 is a front view illustrating a machining system according to an embodiment of the present invention.

Hereinafter, a specific embodiment of the present invention will be described with reference to the drawings. As illustrated in FIGS. 1 to 5, a machining system 1 according to this embodiment consists of a machine tool 10 as an industrial machinery, a holding device 20, and a conveyance system 40.

The machine tool 10 has a conventionally known configuration; therefore, detailed description of the configuration is omitted here. Roughly describing, as illustrated in FIGS. 1 to 5, the machine tool 10 includes a chuck 11 mounted on a spindle (not illustrated), a tool spindle 12 for holding a tool, a steady rest 13, a door 15 opening and closing a machining area, an operation panel 16, and a numerical controller 17. The chuck 11 clamps one end of a workpiece W that is described later. The workpiece W clamped by the chuck 11 is rotated at a predetermined rotational speed about the spindle axis by rotation of the spindle (not illustrated). Further, the workpiece W is indexed at a predetermined angle about the spindle axis by an indexing operation of the spindle (not illustrated).

The tool spindle 12 is able to hold a tool for turning fixedly and also able to hold a rotary tool for drilling or milling rotatably. The tool spindle 12 is moved in X-axis, Y-axis, and Z-axis directions by appropriate feeding mechanisms (not illustrated). The machine tool 10 also includes a tool changer (not illustrated) that has a tool magazine (not illustrated) for storing typical tools. The tool attached to the tool spindle 12 is changed by this tool changer.

The X-axis is a vertical axis. The Z-axis is a horizontal axis perpendicular to the X-axis and parallel to the axis of the spindle (not illustrated). The Y-axis is a horizontal axis perpendicular to both the X-axis and the Z-axis. In the following description, these three axes, namely, the X-axis, the Y-axis, and the Z-axis, are used as reference axes of a three-dimensional space where the machining system 1 according to this embodiment is installed.

The steady rest 13 is movable in the Z-axis direction by an appropriate drive device (not illustrated). The steady rest 13 supports from below an outer peripheral surface of the other end of the workpiece W clamped by the chuck 11 with two supporting members 14 such that the workpiece W is rotatable. The supporting members 14 are able to be raised to a supporting position and lowered to a retracted position. The door 15 is movable in the Z-axis direction by an appropriate drive device (not illustrated) so as to open and close the machining area.

Under control by the numerical controller 17, the machine tool 10 performs turning on the workpiece W clamped by the chuck 11 with a fixed tool attached to the tool spindle 12 in the state where the workpiece W is being rotated at a predetermined rotational speed, and also performs drilling and milling on the workpiece W clamped by the chuck 11 with a rotary tool attached to the tool spindle 12 in the state where the workpiece W is stopped or in the state where the workpiece W is being rotated at a predetermined feed speed about the spindle axis by the spindle (not illustrated). Thus, the machine tool 10 in this embodiment is able to perform multiple machining, namely, turning, drilling, and milling.

Figure 2:
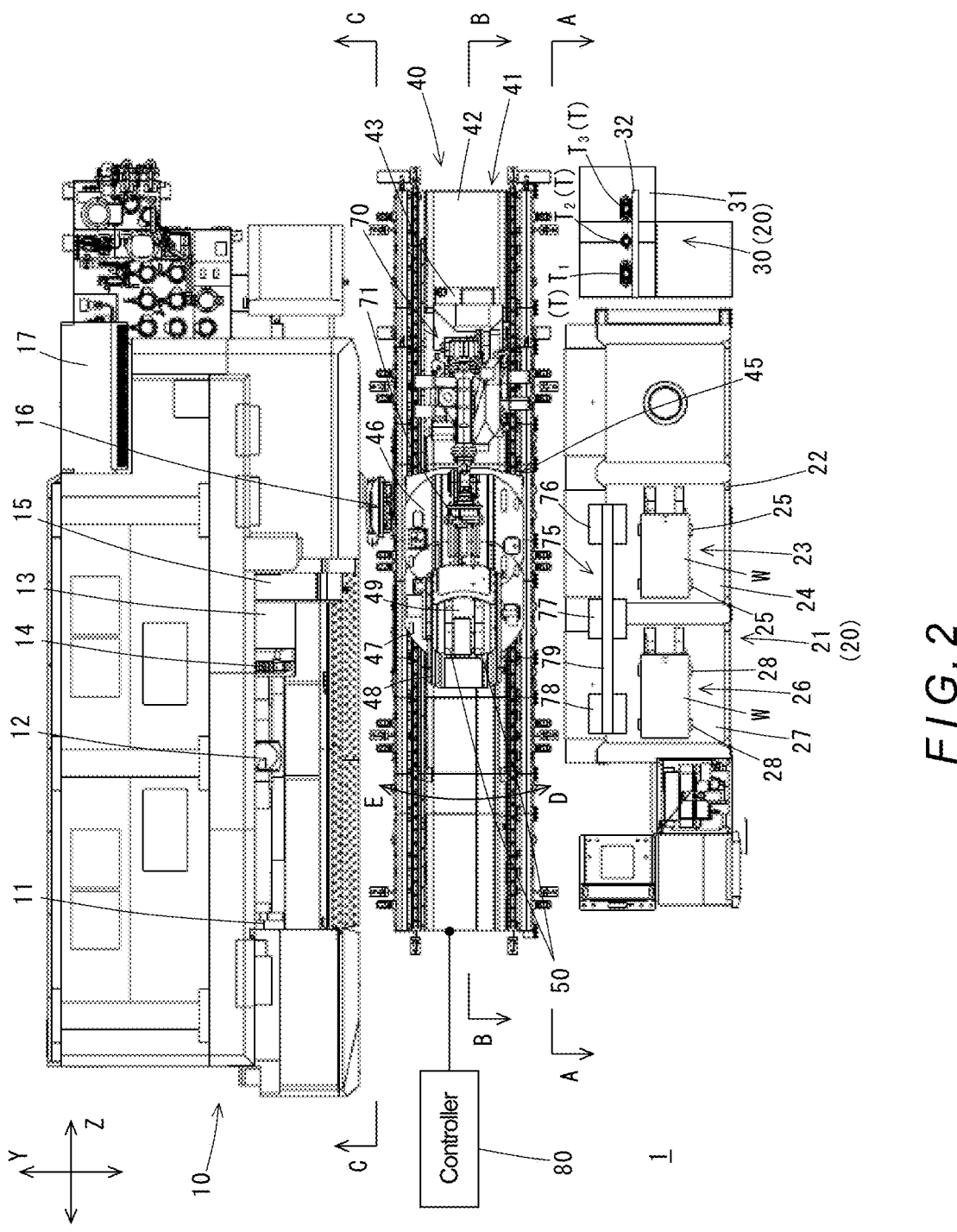
FIG. 2 is a plan view illustrating the machining system according to the embodiment.
Figure 3:
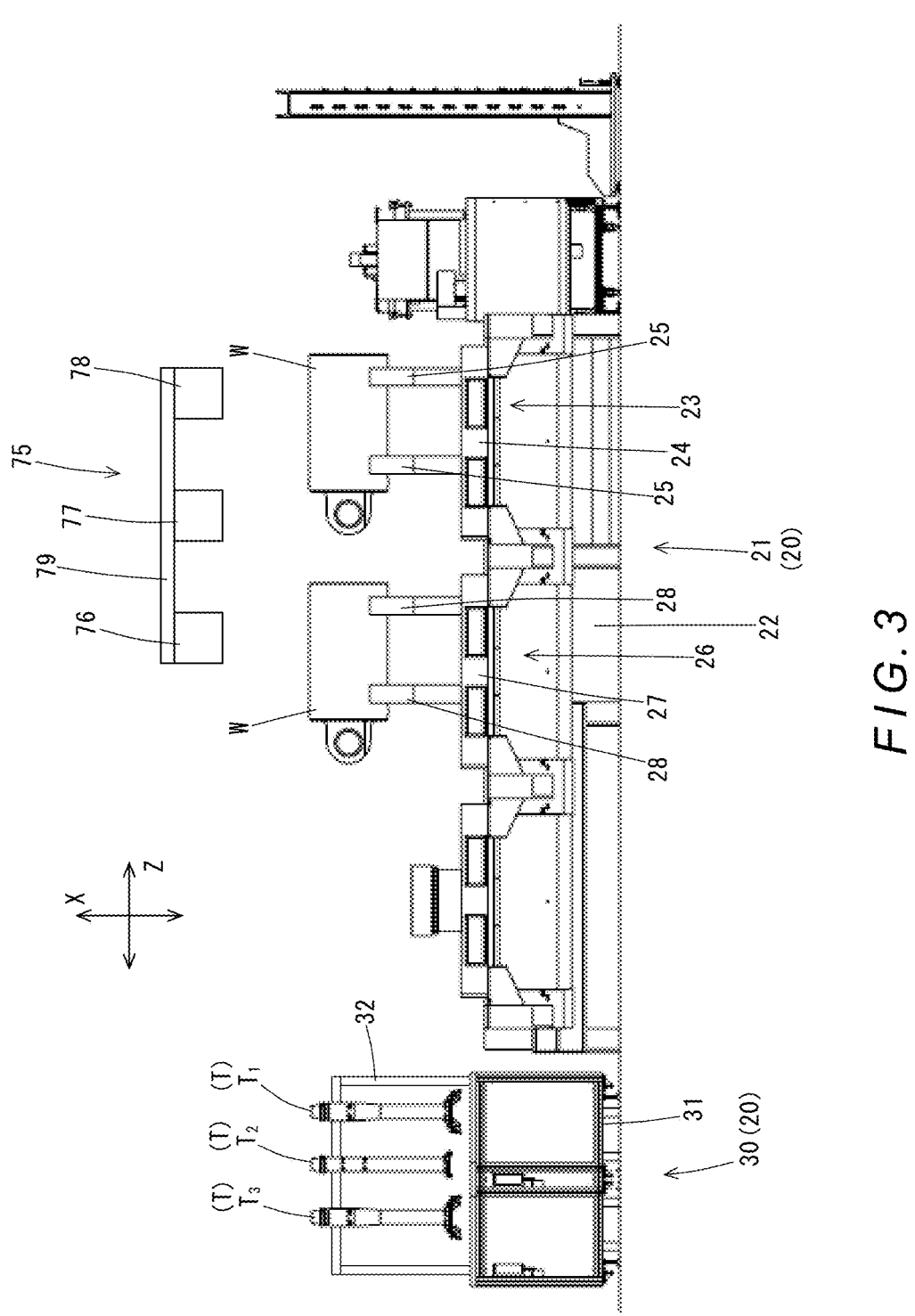
FIG. 3 is a view as viewed in the direction of arrow A-A in FIG. 2.

As illustrated in FIG. 2, the holding device 20 is arranged at a predetermined distance from the machine tool 10 in the Y-axis direction. The holding device 20 has a workpiece holding device 21 and a tool holding device 30 that are respectively located on the left and right sides in the Z-axis direction as viewed from the front as shown in FIG. 1.

The workpiece holding device 21 has a base 22, a first station 23, and a second station 26. The base 22 is disposed along the Z-axis. The first station 23 and the second station 26 are respectively located on the right and left sides in the Z-axis direction on the base 22 as viewed from the front. The workpiece W in this example is composed of a fork end that is formed by a cylindrical portion and two fork portions protruding in parallel along the axial direction from the cylindrical portion. The first station 23 and the second station 26 are each supplied with workpieces W from outside by appropriate supply means.

The first station 23 has a support base 24 and two workpiece supporting frames 25, 25. The support base 24 is arranged on the base 22 and the workpiece supporting frames 25, 25 are erected at a predetermined interval along the Z-axis direction on the support base 24. The workpiece supporting frames 25, 25 support the cylindrical portion of the workpiece W. Similarly, the second station 26 has a support base 27 and two workpiece supporting frames 28, 28. The support base 27 is arranged on the base 22 and the workpiece supporting frames 28, 28 are erected at a predetermined interval along the Z-axis direction on the support base 27. The workpiece supporting frames 28, 28 support the cylindrical portion of the workpiece W. Each of the workpiece supporting frames 25, 25 and workpiece supporting frames 28, 28 has two supporting portions that are formed at a predetermined interval in the Y-axis direction, so that each workpiece supporting frame 25, 25, 28, 28 supports the workpiece W at two points with the supporting portions.

The tool holding device 30 has a base 31 and a tool holding frame 32 erected on the base 31. The tool holding frame 32 is formed in portal shape. In this example, three tools T ($T_1$, $T_2$, $T_3$) are held vertically at predetermined intervals on a horizontal portion of the tool holding frame 32. The tool holding device 30 holds non-standard elongated tools T that are unable to be stored in the tool magazine (not illustrated) and are each heavy for a tool.

The conveyance system 40 includes a conveyance device 41, a transfer device 45, a robot 70, and a hand storage device 75. The conveyance device 41, the transfer device 45, and the robot 70 are arranged between the machine tool 10 and the holding device 20. The hand storage device 75 is arranged above the workpiece holding device 21.

The conveyance device 41 consists of a conveyance base 42 disposed along the Z-axis, a moving platform 43 arranged on the conveyance base 42 to be movable along the Z-axis, and a drive device (not illustrated) moving the moving platform 43. The conveyance base 42 is provided with a guide rail that is disposed along the Z-axis. The moving platform 43 moves in the Z-axis direction while being guided by the guide rail.

The drive device (not illustrated) consists of, for example, a rack (not illustrated) arranged along the Z-axis on the conveyance base 42, a pinion gear (not illustrated) arranged on the moving platform 43, and a motor (not illustrated) driving the pinion gear (not illustrated). The pinion gear (not illustrated) meshes with the rack (not illustrated). The pinion gear (not illustrated) is rotated by the motor (not illustrated), so that the moving platform 43 moves along the Z-axis through the meshing between the pinion gear (not illustrated) and the rack (not illustrated). The position of the moving platform 43 is detected, for example, by a position detector (not illustrated) that consists of a scale (not illustrated) arranged along the Z-axis on the conveyance base 42 and a reader (not illustrated) arranged on the moving platform 43 to read a position on the scale (not illustrated). The moving platform 43 is movable to working positions set for the machine tool 10, working positions set for the workpiece holding device 21, and working positions set for the tool holding device 30.

Figure 4:
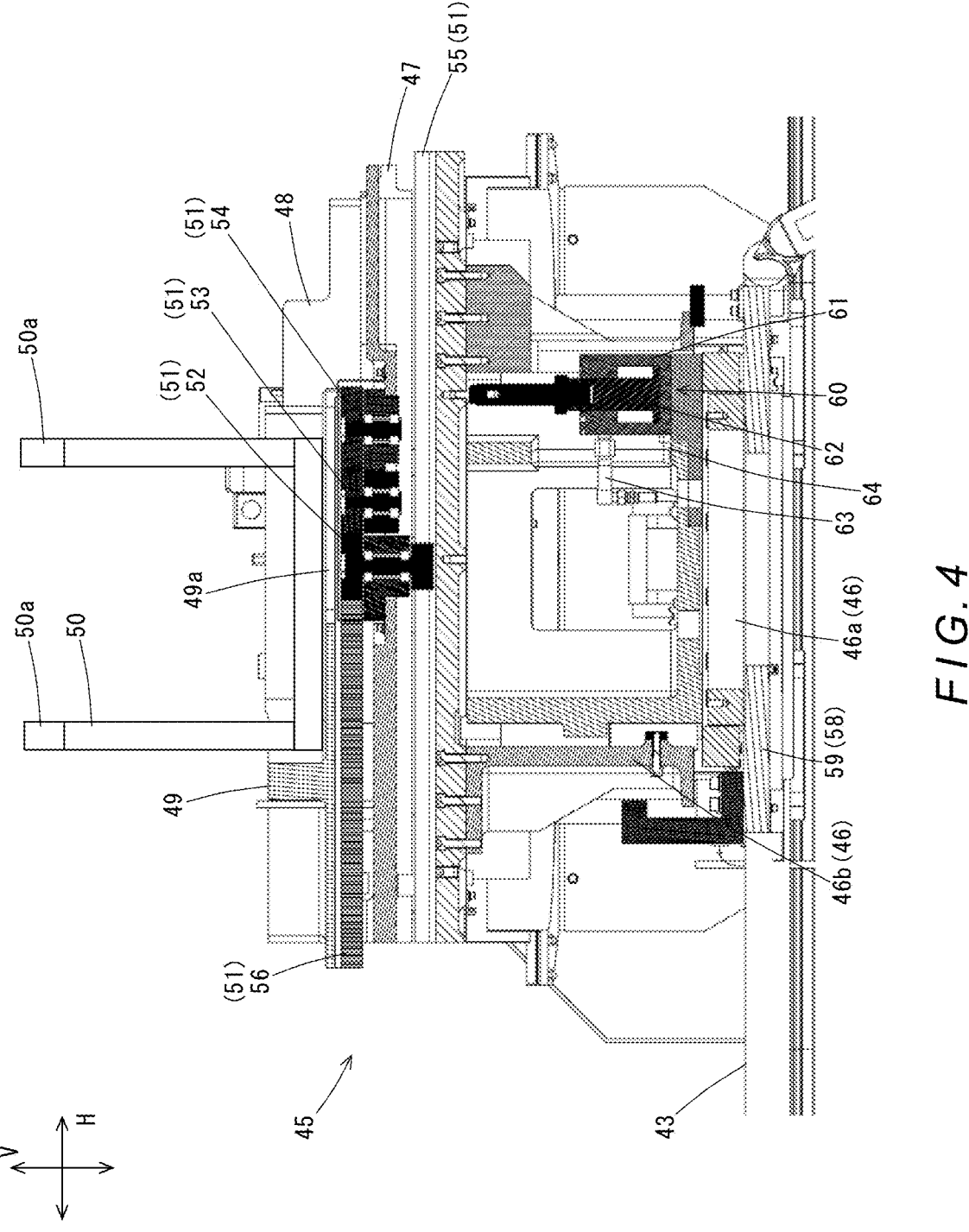
FIG. 4 is a sectional view of a moving platform and a transfer device in the embodiment taken along line B-B in FIG. 2.
Figure 5:
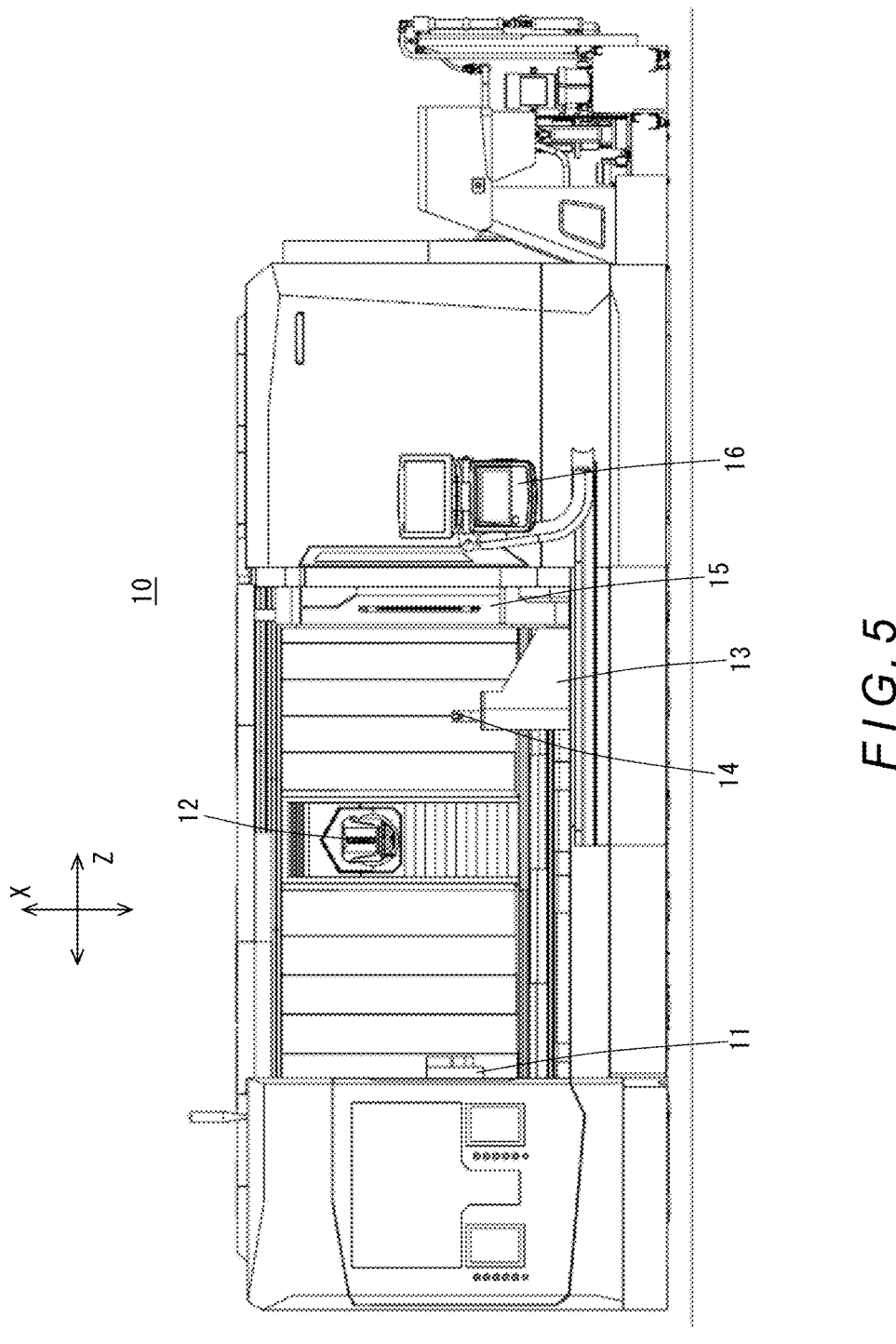
FIG. 5 is a view of a machine tool in the embodiment as viewed in the direction of arrow C-C in FIG. 2.

As illustrated in FIGS. 2 and 4, the transfer device 45 has a transfer base 46, a first transfer platform 47, a second transfer platform 48, a third transfer platform 49, a pair of supporting members 50, 50, an advancing and retracting mechanism 51, a turning mechanism 58, and a raising and lowering mechanism 60. The transfer base 46 is arranged on the moving platform 43 of the conveyance device 41. The first transfer platform 47, the second transfer platform 48, and the third transfer platform 49 are arranged on the transfer base 46. The pair of supporting members 50, 50 are arranged on the third transfer platform 49. The advancing and retracting mechanism 51 advances and retracts the first transfer platform 47, the second transfer platform 48, and the third transfer platform 49 in the direction of a common H-axis as a horizontal axis. The turning mechanism 58 turns the transfer base 46. The raising and lowering mechanism 60 raises and lowers the transfer base 46. Each of the first transfer platform 47, second transfer platform 48, and third transfer platform 49 advances and retracts in the H-axis direction while being guided by a guide rail.

The transfer base 46 consists of a first structure 46a located on the lower side and a second structure 46b located on the upper side. The first transfer platform 47 is arranged on the second structure 46b. The first structure 46a is coupled to the second structure 46b with the upper side of the first structure 46a inserted in the second structure 46b. The second structure 46b is able to be raised and lowered with respect to the first structure 46a.

The advancing and retracting mechanism 51 includes three pinion gears, namely, a first pinion gear 52 and a second pinion gear 53 arranged on the first transfer platform 47 and a third pinion gear 54 arranged on the second transfer platform 48, a motor (not illustrated) driving these pinion gears, a rack 55 arranged on the transfer base 46, a rack 56 arranged on the second transfer platform 48, and a rack (not illustrated) arranged on the third transfer platform 49. The first pinion gear 52 meshes with the rack 55, the second pinion gear 53 meshes with the rack 56, and the third pinion gear 54 meshes with the not-illustrated rack arranged on the third transfer platform 49.

Thus, in the advancing and retracting mechanism 51, the first transfer platform 47 is advanced and retracted in the H-axis direction through the meshing between the first pinion gear 52 and the rack 55, the second transfer platform 48 is advanced and retracted in the H-axis direction through the meshing between the second pinion gear 53 and the rack 56, and the third transfer platform 49 is advanced and retracted in the H-axis direction through the meshing between the third pinion gear 54 and the not-illustrated rack.

The position of the first transfer platform 47 with respect to the transfer base 46 is detected by a first position detector (not illustrated) that consists of a first scale (not illustrated) arranged along the H-axis on the transfer base 46 and a first reader (not illustrated) arranged on the first transfer platform 47 to read a position on the first scale (not illustrated). Similarly, the position of the second transfer platform 48 with respect to the first transfer platform 47 is detected by a second position detector (not illustrated) that consists of a second scale (not illustrated) arranged along the H-axis on the first transfer platform 47 and a second reader (not illustrated) arranged on the second transfer platform 48 to read a position on the second scale (not illustrated). Similarly, the position of the third transfer platform 49 with respect to the second transfer platform 48 is detected by a third position detector (not illustrated) that consists of a third scale (not illustrated) arranged along the H-axis on the second transfer platform 48 and a third reader (not illustrated) arranged on the third transfer platform 49 to read a position on the third scale (not illustrated).

The supporting members 50 are disposed along the advancing and retracting direction with a predetermined interval therebetween on the third transfer platform 49, and each supporting member 50 supports the cylindrical portion of the workpiece W with two supporting portions 50a, 50a arranged along the advancing and retracting direction. The third transfer platform 49 has a cutout 49a that is formed between the supporting members 50, 50 to extend inward (i.e., in the retracting direction) from the end in the advancing direction.

The turning mechanism 58 turns the transfer base 46 about a V-axis as a vertical axis. The turning mechanism 58 consists of a spur gear 59 connected to the lower end of the transfer base 46, a pinion gear (not illustrated) arranged on the moving platform 43 and meshing with the spur gear 59, and a motor (not illustrated) driving the pinion gear (not illustrated). The spur gear 59 is rotated by the pinion gear (not illustrated) driven by the motor (not illustrated), so that the transfer base 46 is turned in the direction of arrow D-E shown in FIG. 2 about the V-axis by the rotation of the spur gear 59.

The raising and lowering mechanism 60 raises and lowers the second structure 46b of the transfer base 46. The raising and lowering mechanism 60 consists of a hydraulic cylinder 61 arranged on the first structure 46a, a piston 62 inserted in a cylinder chamber of the hydraulic cylinder 61, and a pressurized oil supply source (not illustrated) supplying pressurized oil into the cylinder chamber of the hydraulic cylinder 61 through supply pipes 63 and 64. The hydraulic cylinder 61 is arranged such that the axis thereof extends along the V-axis. The piston 62 is connected at the upper end to the second structure 46b. Thus, when pressurized oil is supplied into the lower cylinder chamber through the supply pipe 64 from the pressurized oil supply source (not illustrated), the second structure 46b is raised by the action of the piston 62. Conversely, when pressurized oil is supplied into the upper cylinder chamber through the supply pipe 63 from the pressurized oil supply source (not illustrated), the second structure 46b is lowered by the action of the piston 62.

The robot 70 is composed of a six-axis articulated robot that has at the distal end of an arm thereof a hand holding unit 71. The robot 70 is able to clamp in the hand holding unit 71 a hand held in the hand storage device 75. Further, the robot 70 is able to move the hand to positions within a three-dimensional space and bring the hand into poses.

The hand storage device 75 is arranged above the workpiece holding device 21. The hand storage device 75 has a support frame 79 and three hand holding frames 76, 77, and 78. The support frame 79 is supported along the Z-axis direction by support means (not illustrated). The hand holding frames 76, 77, 78 are supported at predetermined intervals along the Z-axis direction by the support frame 79. Each hand holding frame 76, 77, 78 stores a hand therein.

The controller 80 is composed of a computer including a CPU, a RAM, and a ROM. The controller 80 controls operations of the conveyance device 41, transfer device 45, robot 70, and other elements to execute a workpiece conveying operation of conveying a workpiece W held by the workpiece holding device 21 and supplying the workpiece W to the machine tool 10 and execute a tool conveying operation of conveying a tool T held by the tool holding device 30 and attaching the tool T to the tool spindle 12 of the machine tool 10. Hereinafter, the operation control by the controller 80 is described.

[Workpiece Conveying Operation]

The workpiece conveying operation in which a workpiece W held by the workpiece holding device 21 is conveyed and supplied to the machine tool 10 by the transfer device 45 of the conveyance system 40 is described here on the basis of FIGS. 6 to 20. Note that reference numerals, except those particularly indicated for the purpose of clarity, are omitted in FIGS. 6 to 20; however, the reference numerals used in FIGS. 1 to 5 are applied (referred to) also in FIGS. 6 to 20 and the following description is made using the reference numerals indicated in FIGS. 1 to 5.

Prior to starting of the operation, the moving platform 43 of the conveyance device 41 has been positioned at its original position (retracted position) that is set at the right end in the Z-axis direction in FIG. 2. Further, as shown in FIG. 4, the first transfer platform 47, second transfer platform 48, and third transfer platform 49 of the transfer device 45 have been positioned at a retracted end that is located above the transfer base 46. The H-axis as the advancing and retracting direction of the transfer platforms is parallel to the Z-axis and the second structure 46b is in the lowered state. On the other hand, the front door 15 of the machine tool 10 has been opened and the steady rest 13 has been positioned at a retracted end that is located on the right side in the Z-axis direction.

The following description is made with respect to the operation for supplying a workpiece W held by the first station 23 of the workpiece holding device 21 to the machine tool 10. The same applies to the operation for supplying a workpiece W held by the second station 26 to the machine tool 10.

The controller 80 first drives the advancing and retracting mechanism 51 to advance the first transfer platform 47 in the H-axis direction. The controller 80 also drives the drive device (not illustrated) of the conveyance device 41 to move the moving platform 43 leftward in the Z-axis direction so as to position the moving platform 43 at a working position set for the first station 23 of the workpiece holding device 21 (see FIG. 2). Thereafter, the controller 80 drives the turning mechanism 58 to turn the transfer base 46 by 90° in the direction of arrow D (see FIGS. 6 and 7). Note that this working position is set also for the second station 26.

Figure 8:
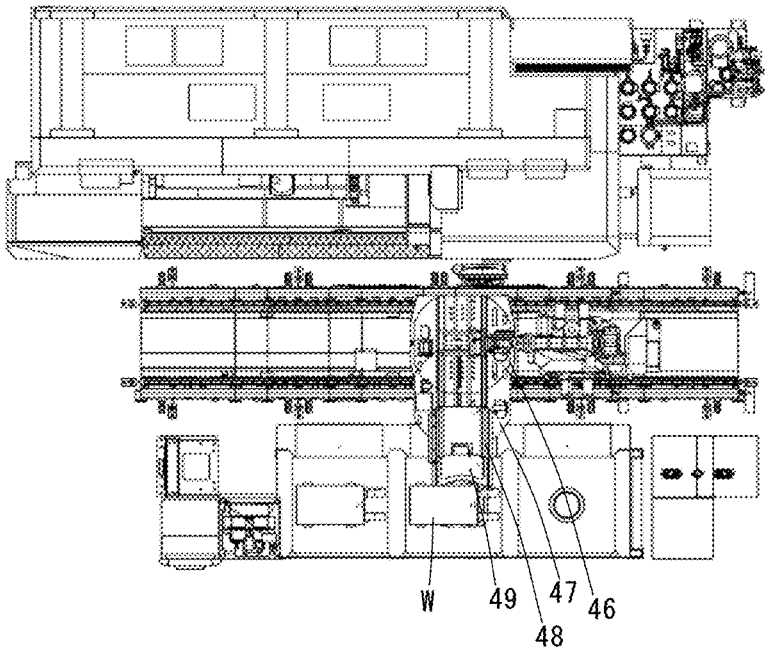
FIG. 8 is an illustrative diagram for explaining the operation of the conveyance system in the embodiment.
Figure 9:
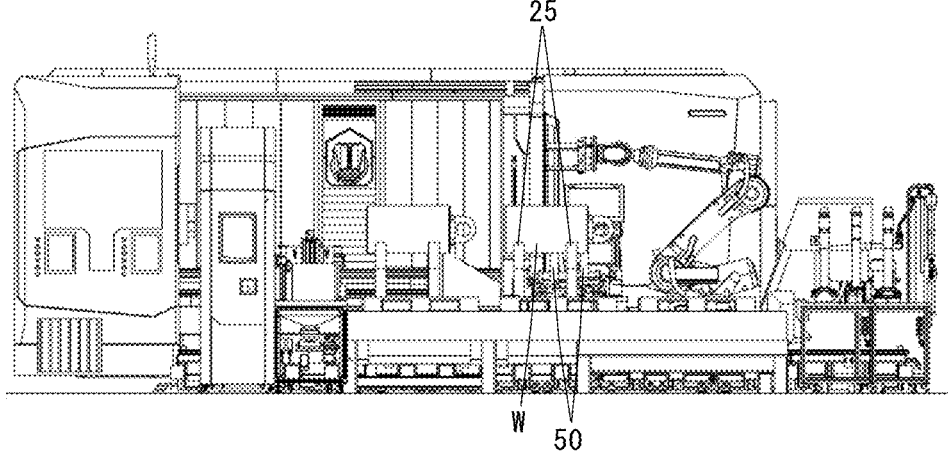
FIG. 9 is an illustrative diagram for explaining the operation of the conveyance system in the embodiment.

Subsequently, the controller 80 drives the advancing and retracting mechanism 51 to advance the second transfer platform 48 and the third transfer platform 49 in the H-axis direction so as to position the supporting members 50, 50 arranged on the third transfer platform 49 at a position below the workpiece W supported by the workpiece supporting frames 25, 25 (see FIGS. 8 and 9). At this time, as shown in FIG. 9, the supporting members 50, 50 are positioned to sandwich the right workpiece supporting frame 25 and the right workpiece supporting frame 25 is positioned in the cutout 49a formed in the third transfer platform 49.

Figure 10:
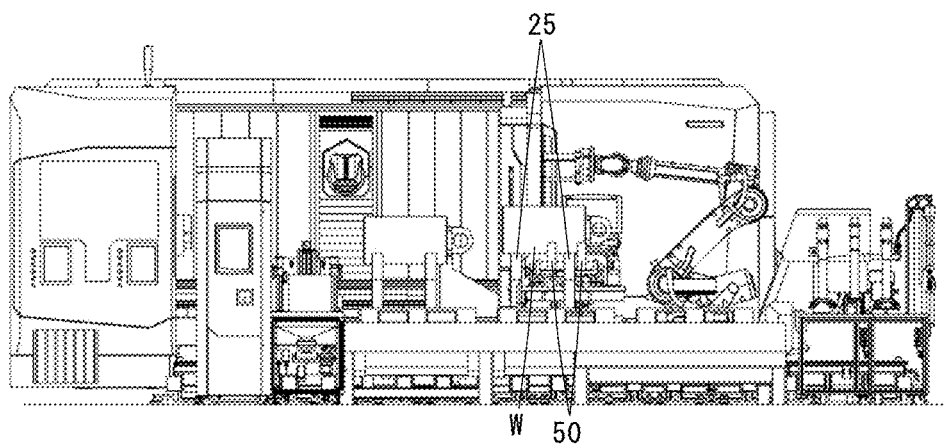
FIG. 10 is an illustrative diagram for explaining the operation of the conveyance system in the embodiment.
Figure 11:
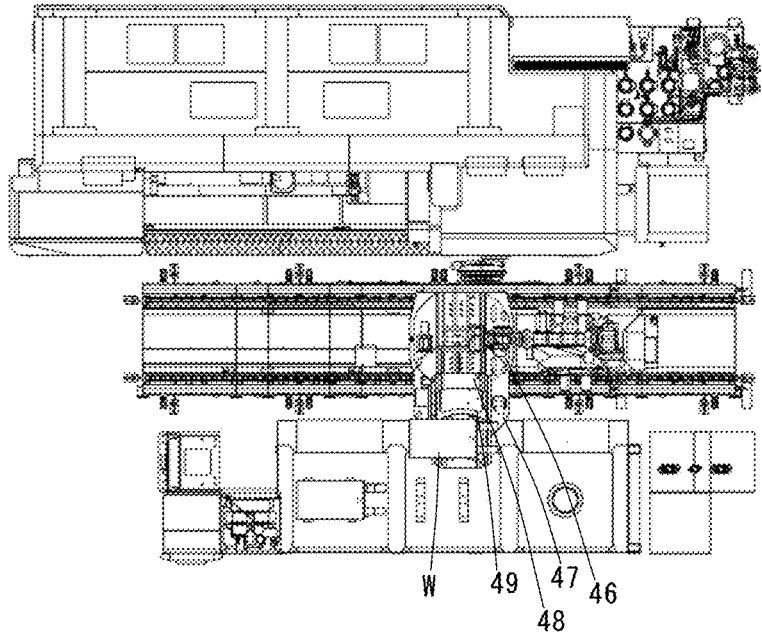
FIG. 11 is an illustrative diagram for explaining the operation of the conveyance system in the embodiment.
Figure 12:
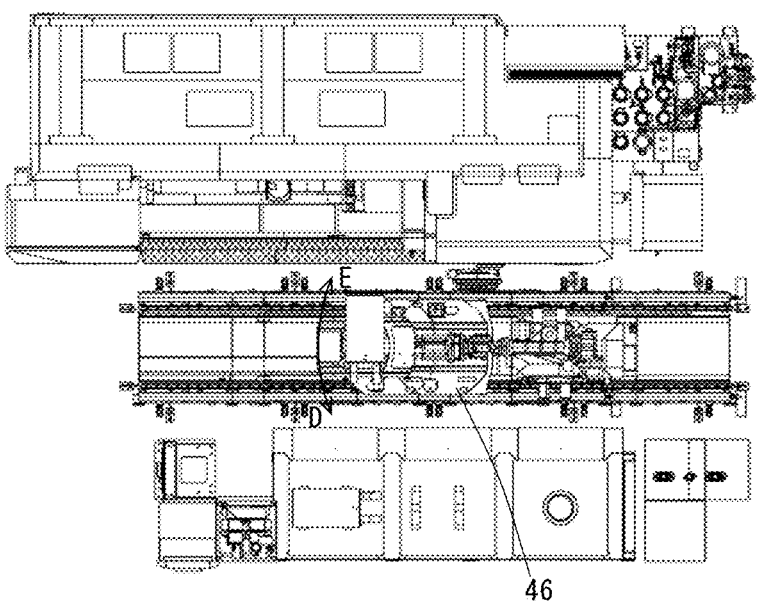
FIG. 12 is an illustrative diagram for explaining the operation of the conveyance system in the embodiment.

Subsequently, the controller 80 drives the raising and lowering mechanism 60 to raise the second structure 46b of the transfer base 46 (see FIG. 10). Thereby, the workpiece W supported by the workpiece supporting frames 25, 25 is moved upward in the state of being supported by the supporting members 50, 50; consequently, the workpiece W is released from the state of being supported by the work-piece supporting frames 25, 25. Thereafter, the controller 80 drives the advancing and retracting mechanism 51 to retract the second transfer platform 48 and the third transfer plat-form 49 as shown in FIG. 11. After these transfer platforms have been retracted to the retracted end, the controller 80 drives the turning mechanism 58 to turn the transfer base 46 by 90° in the direction of arrow E as shown in FIG. 12.

Figure 13:
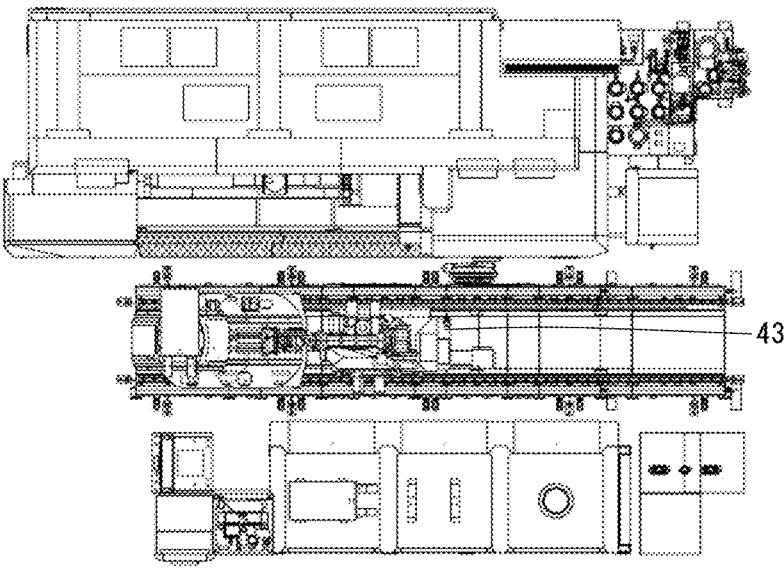
FIG. 13 is an illustrative diagram for explaining the operation of the conveyance system in the embodiment.
Figure 14:
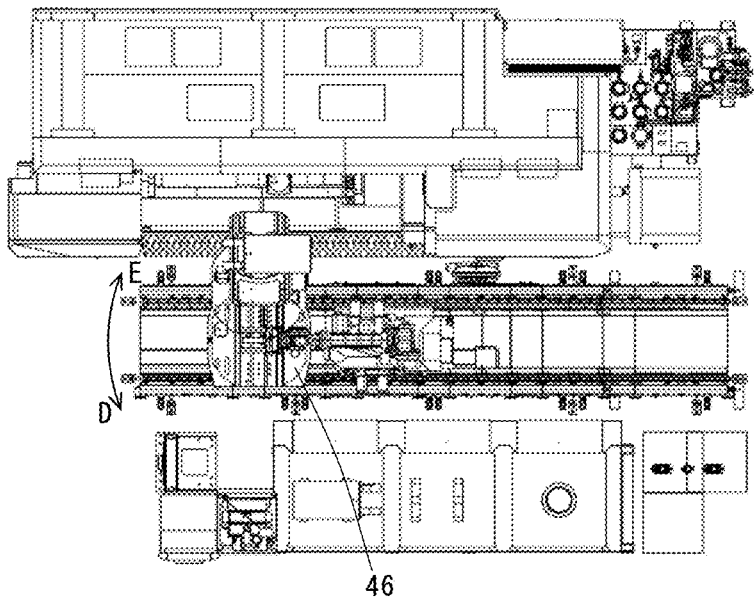
FIG. 14 is an illustrative diagram for explaining the operation of the conveyance system in the embodiment.
Figure 15:
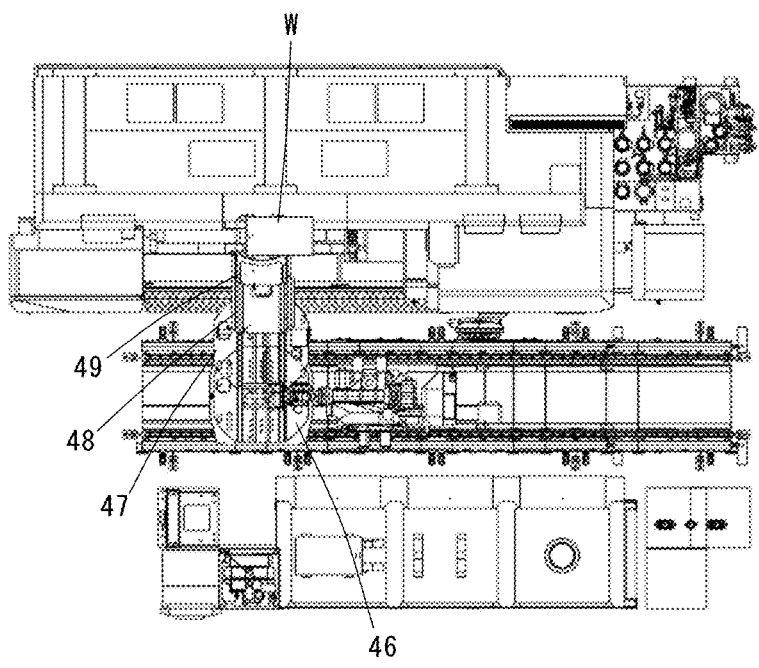
FIG. 15 is an illustrative diagram for explaining the operation of the conveyance system in the embodiment.

Subsequently, the controller 80 drives the drive device (not illustrated) of the conveyance device 41 to move the moving platform 43 leftward in the Z-axis direction so as to position the moving platform 43 at a working position set for the machine tool 10 (see FIG. 13). Subsequently, the con-troller 80 drives the turning mechanism 58 to turn the transfer base 46 by 90° in the direction of arrow E as shown in FIG. 14. Subsequently, the controller 80 drives the advancing and retracting mechanism 51 to advance the second transfer platform 48 and the third transfer platform 49 in the H-axis direction as shown in FIG. 15. Thereby, the axis of the workpiece W supported by the supporting mem-bers 50, 50 becomes coaxial with the axis of the spindle (not illustrated) and chuck 11.

Figure 16:
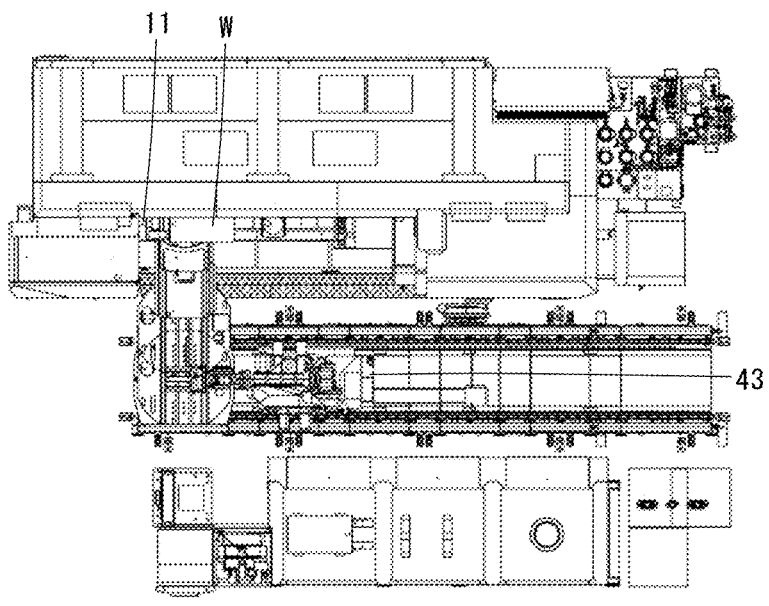
FIG. 16 is an illustrative diagram for explaining the operation of the conveyance system in the embodiment.
Figure 17:
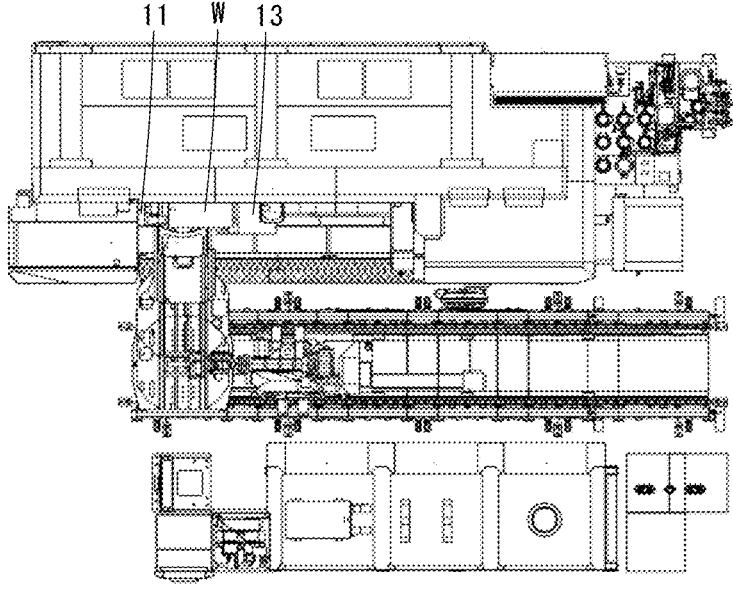
FIG. 17 is an illustrative diagram for explaining the operation of the conveyance system in the embodiment.

Subsequently, the controller 80 drives the drive device (not illustrated) of the conveyance device 41 to move the moving platform 43 leftward in the Z-axis direction so as to position the workpiece W at a position for being clamped by the chuck 11 (see FIG. 16). Thereafter, the controller 80 transmits a workpiece setting completion signal to the machine tool 10. Upon receiving this workpiece setting completion signal, the machine tool 10 causes the chuck 11 to clamp the workpiece W and also moves the steady rest 13 toward the chuck 11 along the Z-axis so as to position the supporting members 14 of the steady rest 13 at a position below the right-side end of the workpiece W. Subsequently, the machine tool 10 raises the supporting members 14 so that the right-side end of the workpiece W is supported by the supporting members 14 (see FIG. 17). Thereafter, the machine tool 10 transmits a workpiece clamping completion signal to the controller 80.

Figure 18:
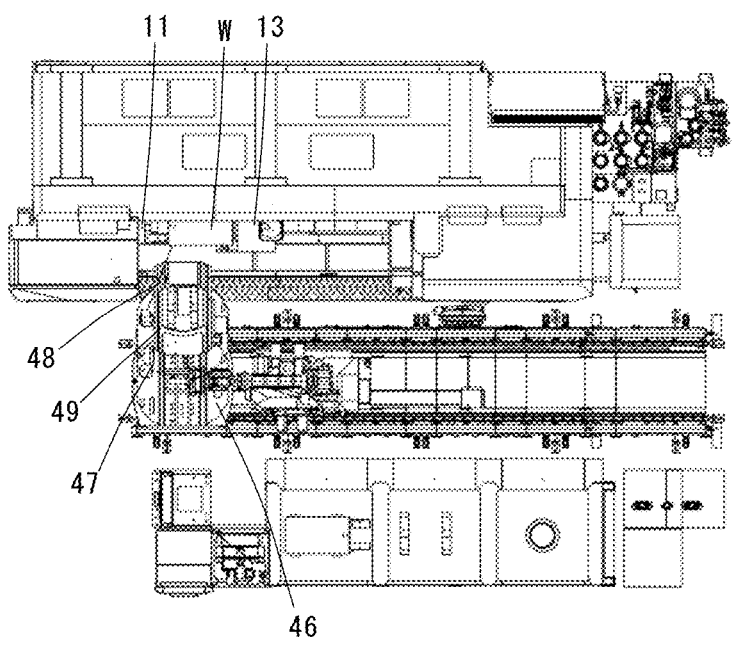
FIG. 18 is an illustrative diagram for explaining the operation of the conveyance system in the embodiment.
Figure 19:
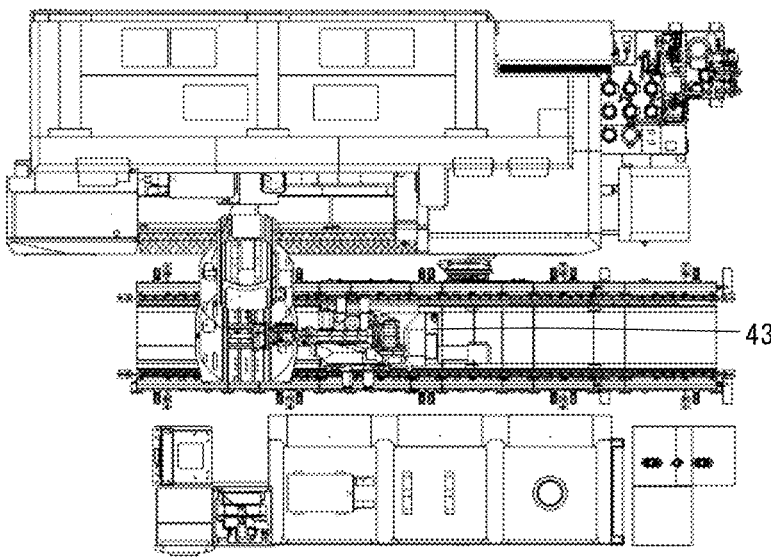
FIG. 19 is an illustrative diagram for explaining the operation of the conveyance system in the embodiment.
Figure 20:
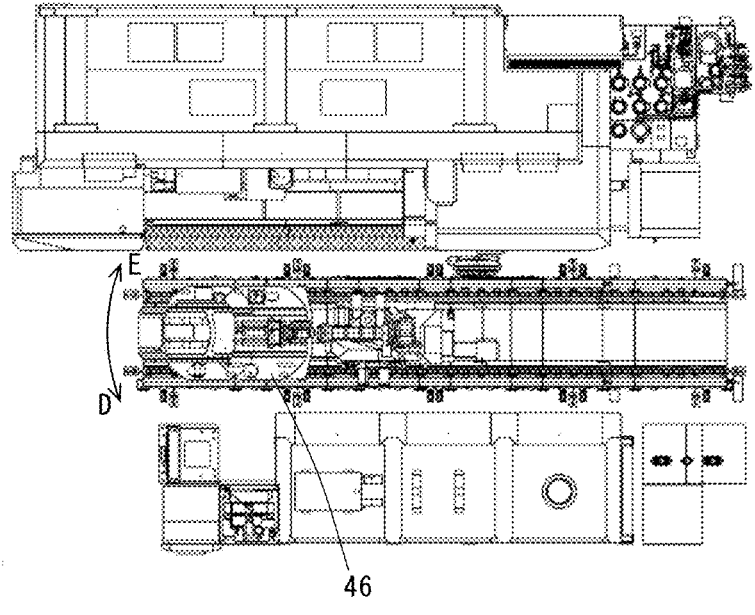
FIG. 20 is an illustrative diagram for explaining the operation of the conveyance system in the embodiment.
Figure 21:
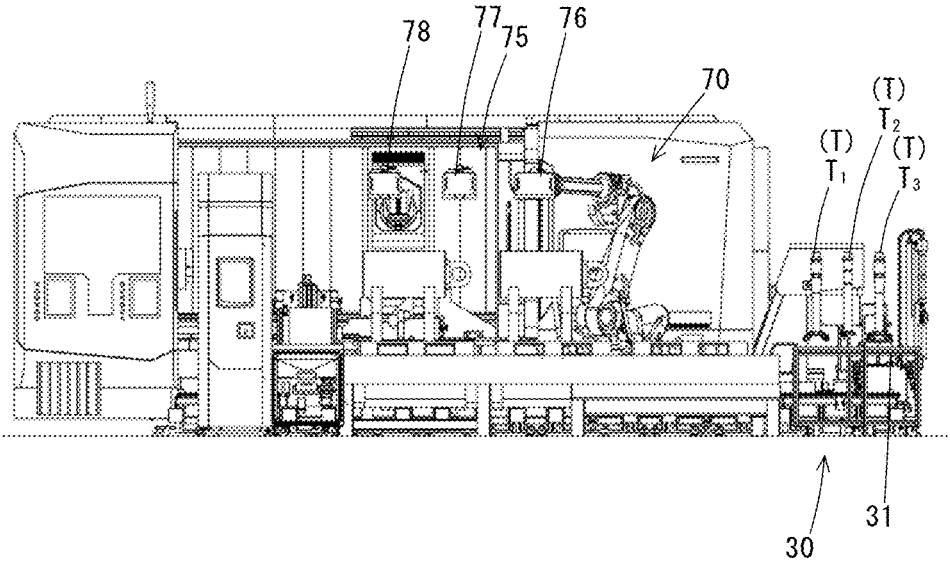
FIG. 21 is an illustrative diagram for explaining the operation of the conveyance system in the embodiment.

Upon receiving this workpiece clamping completion sig-nal, the controller 80 drives the raising and lowering mecha-nism 60 to lower the second structure 46b of the transfer base 46, and then retracts the second transfer platform 48 and the third transfer platform 49 in the H-axis direction (see FIG. 18). Subsequently, the controller 80 drives the drive device (not illustrated) of the conveyance device 41 to move the moving platform 43 rightward in the Z-axis direction to the working position set for the machine tool 10 (see FIG. 19). Subsequently, the controller 80 drives the turning mechanism 58 to turn the transfer base 46 by 90° in the direction of arrow D as shown in FIG. 20. After this turning operation is completed, the controller 80 transmits an exit signal to the machine tool 10. Upon receiving this exit signal, the machine tool 10 closes the front door 15 and performs predetermined machining on the workpiece W. On the other hand, the controller 80 drives the drive device (not illustrated) of the conveyance device 41 to move the moving platform 43 rightward in the Z-axis direction to return the moving platform 43 to the original position (retracted posi-tion).

Through the above-described operation control, the con-troller 80 causes the conveyance system 40 to convey and supply a workpiece W held by the workpiece holding device 21 to the machine tool 10.

[Tool Conveying Operation]

Next, the tool conveying operation in which a tool T held by the tool holding device 30 is conveyed and attached to the tool spindle 12 of the machine tool 10 by the robot 70 of the conveyance system 40 is described on the basis of FIGS. 21 to 33. Note that reference numerals, except those particu-larly indicated for the purpose of clarity, are omitted in FIGS. 21 to 33; however, the reference numerals used in FIGS. 1 to 5 are applied (referred to) also in FIGS. 21 to 33 and the following description is made using the reference numerals indicated in FIGS. 1 to 5.

Prior to starting of the operation, the moving platform 43 of the conveyance device 41 has been positioned at the original position (retracted position) that is set at the right end in the Z-axis direction in FIG. 2. Further, the first transfer platform 47, second transfer platform 48, and third transfer platform 49 of the transfer device 45 have been brought into the state shown in FIG. 2. On the other hand, the front door 15 of the machine tool 10 has been opened and the steady rest 13 has been positioned at the retracted end that is located on the right side in the Z-axis direction. Further, the tool spindle 12 has been positioned at the position shown in FIGS. 1 and 5 and has no tool T attached thereto. The holding hole of the tool spindle 12 faces the chuck 11 side, so that the center axis thereof is parallel to the Z-axis.

Figure 22:
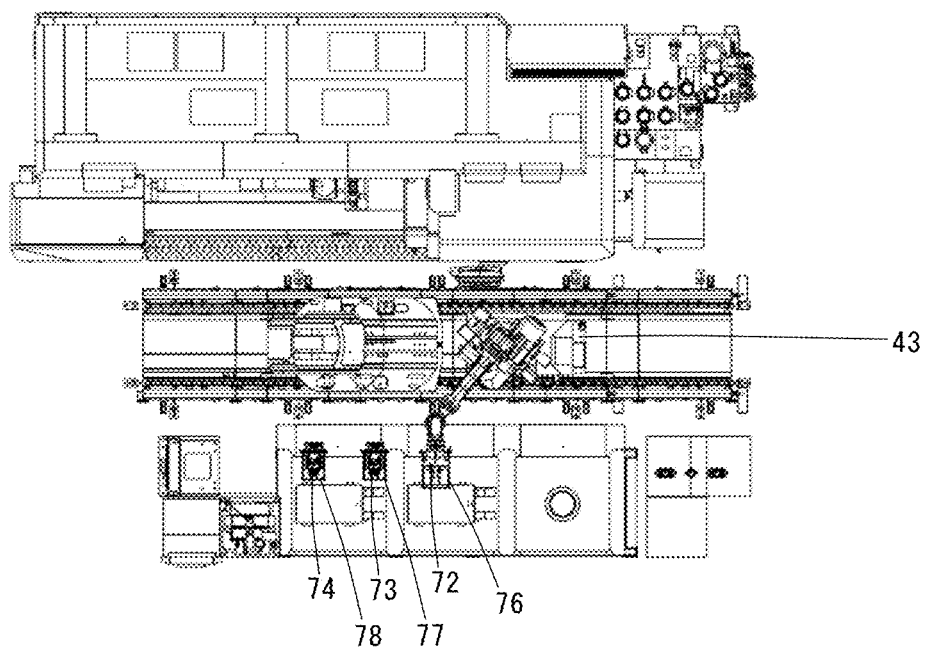
FIG. 22 is an illustrative diagram for explaining the operation of the conveyance system in the embodiment.
Figure 23:
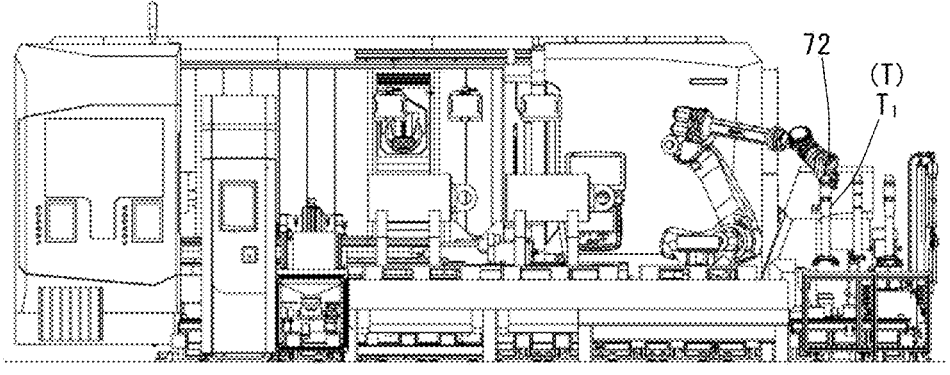
FIG. 23 is an illustrative diagram for explaining the operation of the conveyance system in the embodiment.
Figure 24:
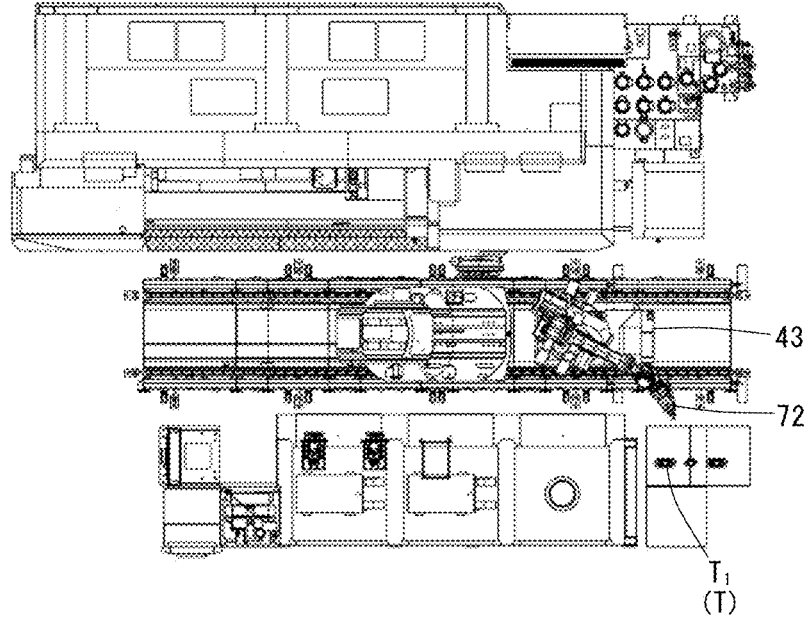
FIG. 24 is an illustrative diagram for explaining the operation of the conveyance system in the embodiment.
Figure 25:
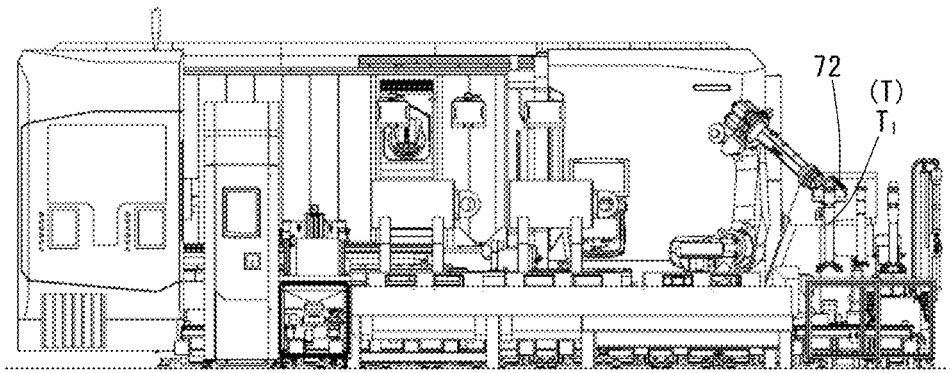
FIG. 25 is an illustrative diagram for explaining the operation of the conveyance system in the embodiment.
Figure 26:
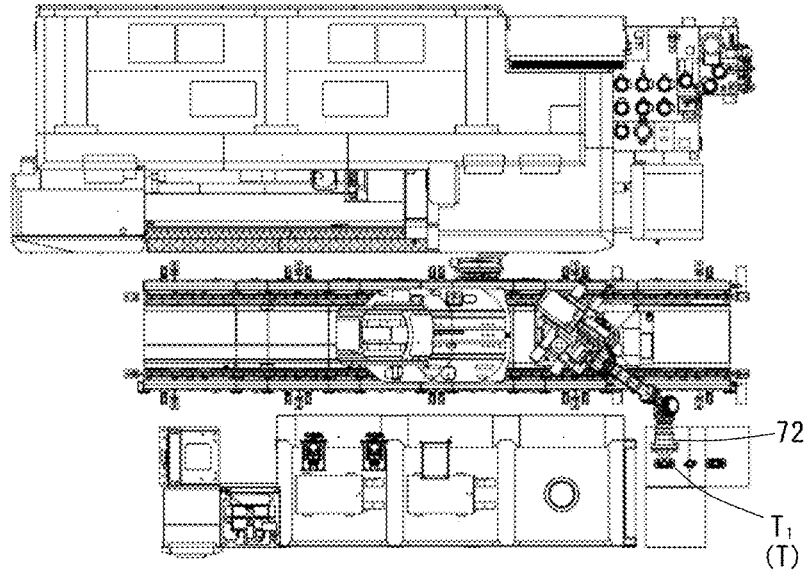
FIG. 26 is an illustrative diagram for explaining the operation of the conveyance system in the embodiment.
Figure 27:
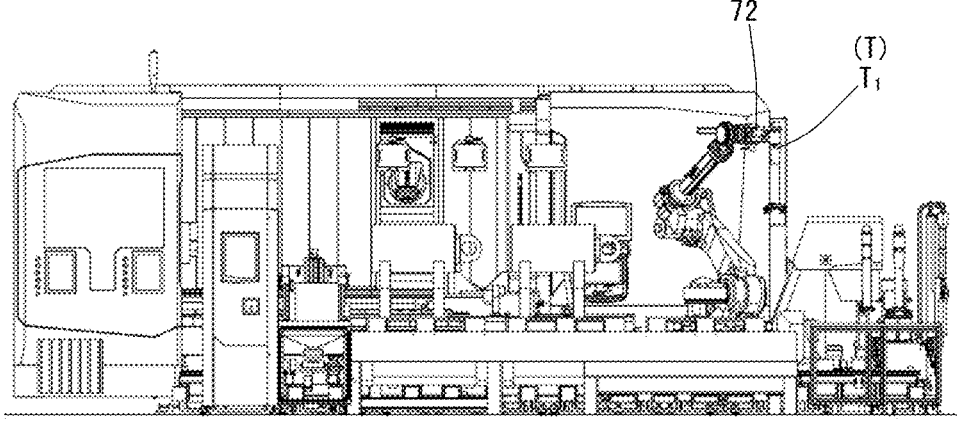
FIG. 27 is an illustrative diagram for explaining the operation of the conveyance system in the embodiment.
Figure 28:
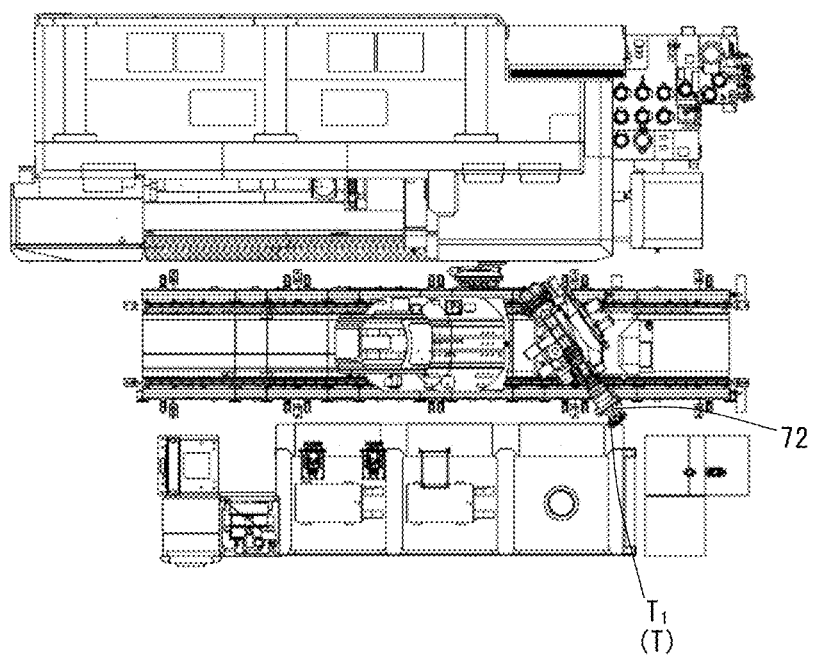
FIG. 28 is an illustrative diagram for explaining the operation of the conveyance system in the embodiment.

Further, the hand holding unit 71 of the robot 70 holds no hand. In the following description, the tool $T_1$ held on the leftmost position in FIG. 2 is to be attached to the tool spindle 12 and a hand 72 for gripping the tool $T_1$ is stored in the hand holding frame 76 located on the rightmost position as shown in FIG. 22. Similarly, a hand 73 for gripping the tool $T_2$ is stored in the hand holding frame 77 and a hand 74 for gripping the tool $T_3$ is stored in the hand holding frame 78. Although the operation for attaching the tool $T_1$ to the tool spindle 12 is described by way of example, the same applies to the operations for attaching the tools $T_2$ and $T_3$ to the tool spindle 12.

The controller 80 first drives the drive device (not illus-trated) of the conveyance device 41 to move the moving platform 43 leftward in the Z-axis direction so as to position the robot 70 at a working position set for the hand holding frame 76. Thereafter, the controller 80 operates the robot 70 to cause the robot 70 to hold the hand 72 stored in the hand holding frame 76 with the hand holding unit 71 (see FIGS. 21 and 22) and then extract the hand 72 from the hand holding frame 76. Note that this working position is set for each of the hand holding frames 76, 77, 78.

Subsequently, the controller 80 drives the drive device (not illustrated) of the conveyance device 41 to move the moving platform 43 rightward in the Z-axis direction so as to position the robot 70 at a working position set for the tool T₁. Thereafter, the controller 80 operates the robot 70 to cause the robot 70 to grip the tool T₁ held by the tool holding frame 32 with the hand 72 (see FIGS. 23 to 26) and then extract the gripped tool T₁ from the tool holding frame 32 (see FIGS. 27 and 28).

Figure 29:
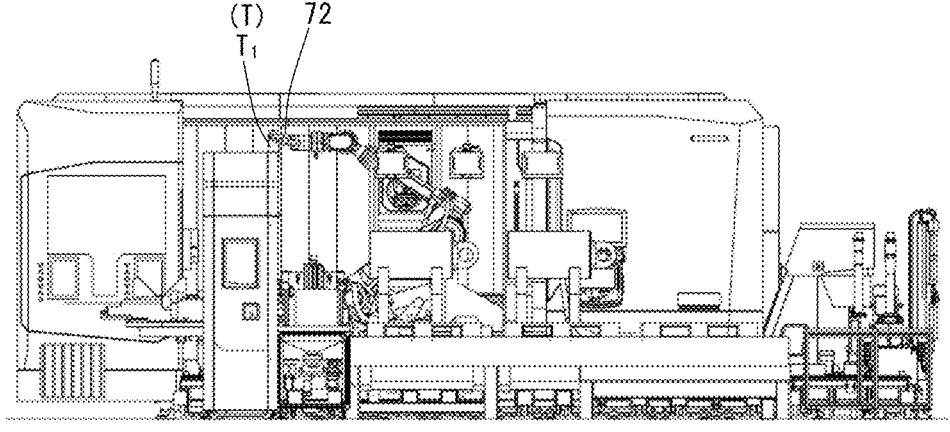
FIG. 29 is an illustrative diagram for explaining the operation of the conveyance system in the embodiment.
Figure 30:
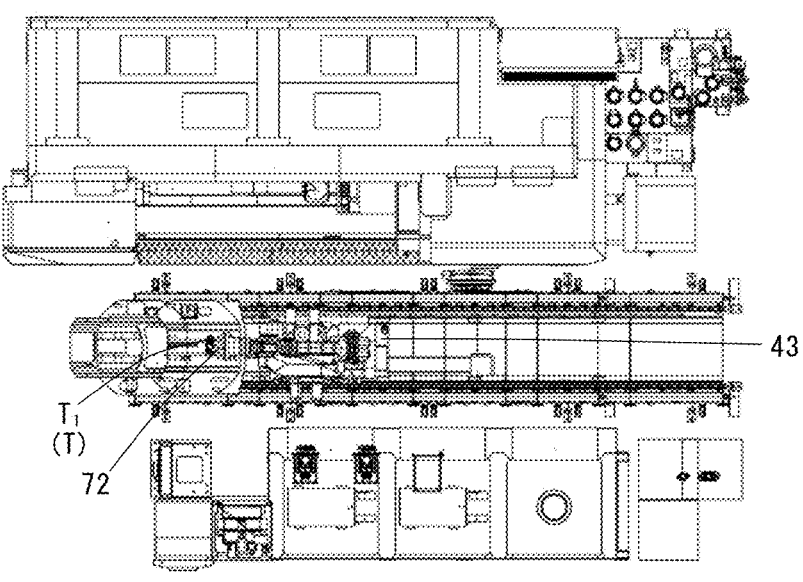
FIG. 30 is an illustrative diagram for explaining the operation of the conveyance system in the embodiment.
Figure 31:
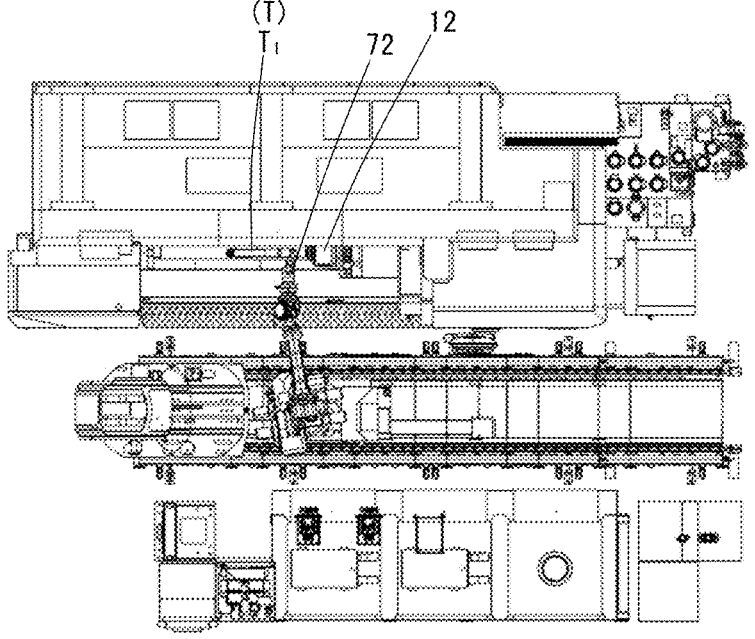
FIG. 31 is an illustrative diagram for explaining the operation of the conveyance system in the embodiment.

Subsequently, the controller 80 drives the drive device (not illustrated) of the conveyance device 41 to move the moving platform 43 leftward in the Z-axis direction so as to position the robot 70 at a working position (tool attachment position) set for the machine tool 10 (see FIGS. 29 and 30). Thereafter, the controller 80 operates the robot 70 to bring the robot 70 into a pose having the tool T₁ gripped with the hand 72 situated parallel to the Z-axis and cause the robot 70 in this pose to load the tool T₁ into the machine tool 10 and insert the tool T₁ into the holding hole of the tool spindle 12 (see FIGS. 31 and 32). Thereafter, the controller 80 transmits a tool insertion signal to the machine tool 10. Upon receiving this tool insertion signal, the machine tool 10 causes the tool spindle 12 to hold the tool T₁ and then transmits a holding completion signal to the controller 80.

Upon receiving this holding completion signal, the controller 80 restores the robot 70 to the pose preceding the entry into the machine tool 10 (see FIG. 33). Subsequently, the controller 80 drives the drive device (not illustrated) of the conveyance device 41 to move the moving platform 43 rightward in the Z-axis direction so as to return the moving platform 43 to the original position (retracted position).

Through the above-described operation control, the controller 80 causes the conveyance system 40 to convey and supply a tool T held by the tool holding device 30 to the machine tool 10.

As described above, the machining system 1 according to this embodiment is able to automatically convey and attach a workpiece W held by the workpiece holding device 21 and a tool T held by the tool holding device 30 to the machine tool 10. Further, the conveyance system 40 in this embodiment is configured to convey an object using the transfer device 45 arranged on the moving platform 43. Accordingly, appropriately setting the load capacity and the like of the moving platform 43 and transfer device 45 enables even a large-sized and heavy workpiece W to be conveyed appropriately.

On the other hand, the conveyance system 40 can convey a relatively small-sized and light object held by the holding device 20, e.g., a tool T held by the tool holding device 30, to the machine tool 10 using the robot 70.

Thus, with the machining system 1 (conveyance system 40) according to this embodiment, it is possible to convey a large-sized and heavy object using the transfer device 45 and convey a relatively small-sized and light object using the robot 70; therefore, it is possible to supply a wide variety of objects to the machine tool 10.

Further, in the conveyance system 40 in this embodiment, the transfer device 45 and the robot 70 that are both heavy in weight are arranged on the moving platform 43. Accordingly, for example, when the first, second, and third transfer platforms 47, 48, and 49 are advanced with a workpiece W supported by the supporting members 50 on the third transfer platform 49 and thereby the first, second, and third transfer platforms 47, 48, and 49 are brought into the state of overhanging from the moving platform 43, the robot 70 acts as a counterbalance, which enables the moving platform 43 to move stably without being subjected to a large unbalanced load. Similarly, when the robot 70 gripping a tool T with the hand 72 is brought into the state of overhanging from the moving platform 43, the transfer device 45 acts as a counterbalance.

Further, in this embodiment, the moving platform 43 is positioned at the retracted position spaced away from the working positions for the machine tool 10 and the workpiece holding device 21 while the conveyance system 40 is in the standby state. This prevents, for example, an operation that needs to be carried out using an overhead crane on the machine tool 10 or the workpiece holding device 20 from being obstructed by the transfer device 45 or the robot 70. Further, it is possible to allow an operator to perform work on the machine tool 10 or the workpiece holding device 20 without being obstructed.

Above has been described a specific embodiment of the present invention. However, it should be noted that the present invention is not limited to the above-described embodiment and can be implemented in other manners.

For example, in the above-described embodiment, the advancing and retracting mechanism 51 is configured to cause the first, second, and third transfer platforms 47, 48, and 49 to overhang in one direction from the transfer base 46. However, the present invention is not limited to this configuration. The advancing and retracting mechanism 51 may be configured to cause the first, second, and third transfer platforms 47, 48, and 49 also to overhang in the opposite direction from the transfer base 46.

This configuration enables the following operation: after the first, second, and third transfer platforms 47, 48, and 49 with a workpiece W supported by the supporting members 50 are retracted to extract the workpiece W from the workpiece holding device 21 (see FIG. 11), the first, second, and third transfer platforms 47, 48, and 49 are further retracted to be rested over the transfer base 46, and subsequently the moving platform 43 is positioned at the working position for the machine tool 10 and then the first, second, and third transfer platforms 47, 48, and 49 are moved to overhang in the opposite direction so as to load the workpiece W supported by the supporting members 50 into the machine tool 10. Thereafter, the steps shown in FIGS. 14 to 18 are performed to attach the workpiece W to the machine tool 10. Note that, after this operation is executed, the first, second, and third transfer platforms 47, 48, and 49 are retracted to be rested over the transfer base 46 and then the moving platform 43 is moved to the retracted position as the original position.

Thus, with this configuration, the transfer base 46 does not need to be turned. Therefore, the turning mechanism 58 in the above-described embodiment does not need to be provided.

Further, in the above-described embodiment, the machine tool 10 and the holding device 20 (the workpiece holding device 21 and the tool holding device 30) are arranged to face each other. However, the present invention is not limited to this arrangement. For example, in FIG. 2, the machine tool 10 may be reversed by 180° and arranged on the left of the workpiece holding device 21. This arrangement enables the following operation: after the first, second, and third transfer platforms 47, 48, and 49 with a workpiece W supported by the supporting members 50 are retracted to extract the workpiece W from the workpiece holding device 21 (see FIG. 11), the moving platform 43 in this state is positioned at the working position for the machine tool 10 and then the steps shown in FIGS. 14 to 18 are performed to attach the workpiece W to the machine tool 10. Also with this configuration, the transfer base 46 does not need to be turned. Therefore, the turning mechanism 58 in the above-described embodiment does not need to be provided.

Further, in the above-described embodiment, when a workpiece W is extracted from the workpiece holding device 21, the second transfer platform 48 and the third transfer platform 49 are advanced to position the supporting members 50, 50 at the position below the workpiece W and then the raising and lowering mechanism 60 is driven to raise the second structure 46*b* of the transfer base 46, whereby the workpiece W is brought into the state of being supported by the supporting members 50, 50. However, the present invention is not limited to this configuration and a configuration is possible in which: the workpiece supporting frames 25, 25 are configured to be able to raised and lowered; and the workpiece W is brought into the state of being supported by the supporting members 50, 50 by positioning the supporting members 50, 50 at the position below the workpiece W and then lowering the workpiece supporting frames 25, 25.

Further, each of the workpiece conveying operation and tool conveying operation in the above-described embodiment may be executed such that the steps take place sequentially or, as long as there is no disadvantage such as interference, for the purpose of operating time reduction, may be executed such that some of the steps take place simultaneously in parallel.

Further, the above-described embodiment is described using the machine tool 10 as an example industrial machinery. However, the industrial machinery to which the present invention is applicable is not limited to the machine tool 10 as described above. Examples of the industrial machinery include, as far as is feasible, a mining machinery, a chemical machinery, an environmental apparatus, a power transmission apparatus, a tank, an industrial washing machine, a boiler prime mover, a plastics machinery, pneumatic and hydraulic machineries, a transport machinery, and a steel manufacturing machinery which fall within the general definitions.

As already mentioned above, the foregoing description of the embodiments is not limitative but illustrative in all aspects. One skilled in the art would be able to make variations and modifications as appropriate. The scope of the invention is not defined by the above-described embodiments, but is defined by the appended claims. Further, the scope of the invention encompasses all modifications made from the embodiments within a scope equivalent to the scope of the claims.

REFERENCE SIGNS LIST

1 Machining system
10 Machine tool
11 Chuck
12 Tool spindle
13 Steady rest
14 Supporting member
15 Front door
16 Operation panel
20 Holding device
21 Workpiece holding device
22 Base
23 First station
24 Support base
25 Workpiece supporting frame
26 Second station
27 Support base
28 Workpiece supporting frame
30 Tool holding device
31 Base
32 Tool holding frame
40 Conveyance system
41 Conveyance device
42 Conveyance base
43 Moving platform
45 Transfer device
46 Transfer base
47 First transfer platform
48 Second transfer platform
49 Third transfer platform
50 Supporting member
51 Advancing and retracting mechanism
52, 53, 54 Pinion gear
55, 56 Rack
58 Turning mechanism
60 Raising and lowering mechanism
61 Hydraulic cylinder
62 Piston
63, 64 Supply pipe
70 Robot
71 Hand holding unit
75 Hand storage device
76, 77, 78 Hand holding frame
79 Frame
80 Controller

The invention claimed is:

1. A conveyance system extracting an object to be conveyed held by a holding device from the holding device and conveying the object to a machine tool, the conveyance system comprising:

a conveyance device having a moving platform and configured to move the moving platform to a working position set for the holding device and to a working position set for the machine tool;

a transfer device and a robot arranged on the moving platform; and a controller configured to control operations of the moving platform, transfer device, and robot, wherein:

the transfer device has: an engagement member arranged to be engageable with the object;

and an advancing and retracting mechanism configured to advance and retract the engagement member in a predetermined direction in a horizontal plane; and the controller is at least configured to sequentially execute a first moving operation of moving the moving platform of the conveyance device to the working position set for the holding device, an engaging operation of engaging the engagement member with the object as a target by causing the advancing and retracting mechanism to advance the engagement member, and an extracting operation of extracting the object from the holding device by causing the advancing and retracting mechanism to retract the engagement member, and thereafter sequentially execute a second moving operation of moving the moving platform to the working position set for the machine tool, a loading operation of loading the conveyed object into the machine tool by causing the advancing and retracting mechanism to advance the engagement member, and a retracting operation of causing the advancing and retracting mechanism to retract the engagement member;

wherein the transfer device is configured to be capable of transporting to the machine tool a first workpiece having a different weight or shape from a second workpiece that the robot can transport to the machine tool.

2. The conveyance system according to claim 1, wherein:

the advancing and retracting mechanism of the transfer device is configured to be able to perform an operation of advancing the engagement member in the direction and an operation of retracting the engagement member to an original position, and is further configured to be able to perform an operation of advancing the engagement member in an opposite direction opposite to the direction and an operation of retracting the engagement member to the original position; and the controller is configured to, in the loading operation, load the conveyed object into the machine tool by causing the advancing and retracting mechanism to advance the engagement member in the opposite direction.

3. The conveyance system according to claim 1, wherein:

the transfer device further has a turning mechanism configured to turn the engagement member about a vertical axis; and the controller is configured to execute, when executing the second moving operation after execution of the extracting operation, a turning operation of causing the turning mechanism to turn the engagement member such that the direction in which the engagement member is advanced and retracted is directed toward the machine tool, and execute the operations subsequent to the second moving operation.

4. The conveyance system according to claim 3, wherein the controller is configured to execute the turning operation and the second moving operation in parallel.

5. The conveyance system according to claim 1, wherein:

the transfer device further has a raising and lowering mechanism configured to raise and lower the engagement member; and the controller is configured to, in the engaging operation, engage the engagement member with the object by causing the advancing and retracting mechanism to advance the engagement member and then causing the raising and lowering mechanism to raise the engagement member, and is further configured to, in the loading operation, load the conveyed object into the machine tool by causing the advancing and retracting mechanism to advance the engagement member, and thereafter cause the raising and lowering mechanism to lower the engagement member.

6. The conveyance system according to claim 1, wherein the controller is configured to operate the conveyance device and transfer device and the robot such that operation of the conveyance device and transfer device and operation of the robot are executed at least partially in parallel.

7. The conveyance system according to claim 1, wherein the conveyance device is configured to be able to move the moving platform to a retracted position spaced away from the working position set for the machine tool.

8. The conveyance system according to claim 1, wherein the conveyance device is configured to be able to move the moving platform to a retracted position spaced away from the working position set for the holding device.

* * * * *